United States Patent
Pandy et al.

(10) Patent No.: US 10,185,473 B2
(45) Date of Patent: Jan. 22, 2019

(54) ADDING NEW SLIDES ON A CANVAS IN A ZOOMING USER INTERFACE

(71) Applicant: Prezi, Inc., San Francisco, CA (US)

(72) Inventors: Laszlo Pandy, Budapest (HU); Ákos Tóth-Máté, Godollo (HU); László Laufer, Budapest (HU); David Udvardy, Budapest (HU); Ádám Somlai-Fisher, Budapest (HU); Vera Gergely, Budapest (HU); Peter Arvai, San Francisco, CA (US); Daniel Vattay, Budapest (HU)

(73) Assignee: Prezi, Inc., San Francisco, CA (US)

( * ) Notice: Subject to any disclaimer, the term of this patent is extended or adjusted under 35 U.S.C. 154(b) by 656 days.

(21) Appl. No.: 14/179,345

(22) Filed: Feb. 12, 2014

(65) Prior Publication Data

US 2014/0372894 A1    Dec. 18, 2014

Related U.S. Application Data

(60) Provisional application No. 61/763,521, filed on Feb. 12, 2013.

(51) Int. Cl.
| | |
|---|---|
| G06F 3/0481 | (2013.01) |
| G06F 3/0482 | (2013.01) |
| G06F 3/0483 | (2013.01) |
| G06F 3/0484 | (2013.01) |

(52) U.S. Cl.
CPC .. G06F 3/0484 (2013.01); *G06F 2203/04806* (2013.01)

(58) Field of Classification Search
CPC .... G06F 3/0481; G06F 3/0482; G06F 3/0483; G06F 3/04817; G06F 9/4443; H04N 5/44543
USPC ......................................... 715/810, 764, 732
See application file for complete search history.

(56) References Cited

U.S. PATENT DOCUMENTS

| | | | | |
|---|---|---|---|---|
| 6,008,807 A * | 12/1999 | Bretschneider | ....... | G06F 3/0485 715/732 |
| 7,383,495 B2 * | 6/2008 | Dontcheva | ............ | G06F 17/241 715/200 |
| 7,493,568 B2 * | 2/2009 | Magendanz | .......... | G06F 9/4443 715/771 |
| 7,505,051 B2 * | 3/2009 | Wang | ...................... | G06T 13/80 345/473 |
| 7,707,503 B2 | 4/2010 | Good et al. | | |
| 7,916,157 B1 * | 3/2011 | Kelley | ................ | G06Q 10/109 345/619 |

(Continued)

*Primary Examiner* — Kevin L Young
*Assistant Examiner* — Erik V Stitt
(74) *Attorney, Agent, or Firm* — Schwegman Lundberg & Woessner, P.A.

(57) ABSTRACT

A method is provided to place new slides on zooming user interface canvas is provided that includes: receiving user request to add a new slide; determining whether a zoom level of a current viewing window has changed to meet a prescribed threshold zoom level since addition of a previously added slide; in response to a determination that the zoom level has changed, using a current viewing window zoom level as a reference zoom level; in response to a determination that the zoom level has not changed, using a previous viewing window zoom level as the reference zoom level; and determining a placement of the new slide with reference to the reference zoom level.

10 Claims, 38 Drawing Sheets

(56) References Cited

U.S. PATENT DOCUMENTS

| | | | |
|---|---|---|---|
| 8,209,630 B2 * | 6/2012 | Thimbleby | G06F 3/04845 345/660 |
| 8,578,273 B2 * | 11/2013 | MacKenzie | G06F 3/04845 715/730 |
| 9,158,445 B2 * | 10/2015 | Wong | G06F 3/0488 |
| 9,589,538 B2 * | 3/2017 | Davidson | G09G 5/32 |
| 2003/0160814 A1 * | 8/2003 | Brown | G06F 3/1423 715/732 |
| 2004/0119852 A1 * | 6/2004 | Shin | H04N 5/23296 348/240.2 |
| 2009/0144158 A1 * | 6/2009 | Matzelle | G06F 17/30899 705/14.56 |
| 2009/0265632 A1 | 10/2009 | Russ et al. | |
| 2010/0031152 A1 * | 2/2010 | Villaron | G06F 3/0481 715/731 |
| 2010/0169784 A1 * | 7/2010 | Weber | G11B 27/034 715/731 |
| 2011/0035702 A1 * | 2/2011 | Williams | G06F 3/0481 715/800 |
| 2011/0302528 A1 * | 12/2011 | Starr | G06F 3/0481 715/800 |
| 2013/0067390 A1 * | 3/2013 | Kwiatkowski | G06F 3/0482 715/784 |
| 2013/0111332 A1 * | 5/2013 | Davis | G06F 3/0488 715/247 |
| 2013/0120400 A1 * | 5/2013 | Maloney | G06T 13/00 345/473 |
| 2013/0205194 A1 * | 8/2013 | Decker | G06F 17/21 715/234 |
| 2013/0271479 A1 * | 10/2013 | Hulubei | G09B 29/006 345/581 |

\* cited by examiner

ADDING NEW SLIDES ON A CANVAS IN A ZOOMING USER INTERFACE

CROSS-REFERENCE TO RELATED APPLICATION(S)

The present application claims the benefit of priority under 35 U.S.C. § 119(e) to U.S. Provisional Application No. 61/763,521, filed Feb. 12, 2013, which is incorporated herein by reference in its entirety.

BACKGROUND

A zooming user interface (ZUI) is a type of graphical user interface (GUI) in which the scale of a viewed area is changed in order to view more detail or less, and to browse through and among different visual display elements such as images, shapes, documents, or videos. Display elements may be added to a workspace referred to as a 'canvas' to create a zoomable presentation in which details and subtopics can be presented through zooming in and out to reveal more or less detail. The canvas is larger than a viewing window generated on a device display screen, and a user can scroll a viewing window to view different display elements disposed on different regions of the canvas. The ZUI differs from a normal canvas in that the user may zoom in or out onto a particular display element. Display elements can be inserted anywhere among the presentation content, in addition to grouping display elements within frames. Users can pan across the canvas in two dimensions (in 2D) and zoom into objects of interest. Display elements present inside a zoomed region can in turn be zoomed themselves to reveal additional detail, allowing for recursive nesting and an arbitrary level of zoom. For example, as a user zooms into a text object, the text may be represented initially as a small dot, then as a thumbnail image, next as a complete page and finally as a magnified view of a portion of the page focused on a key passage from the text. Thus, ZUIs use zooming as the primary metaphor for browsing through multivariate or hyperlinked information.

FIG. 1A-1C are an illustrative drawings showing three different portions of a canvas at three different zoom levels viewed through a viewing window. FIG. 1A shows a viewing window 3 through which portions of display elements 4 and 6 disposed on a canvas 2 are visible but in which display elements 8-14 on the canvas 2 are not visible. The four arrows in FIG. 1A indicate the ability to move the viewing window so as to pan across the canvas 2. FIG. 1B shows a zoomed out view of the same canvas 2 in which display elements 4-14 are visible through the viewing window 3. FIG. 1C shows a zoomed in view of display element 6 on the same canvas 2 through the viewing window 3.

BRIEF DESCRIPTION OF THE DRAWINGS

FIGS. 5A-5C-2 are illustrative drawings representing changes in canvas locations visible through a viewing window in accordance with some embodiments.

DESCRIPTION OF EMBODIMENTS

Figure 1A:
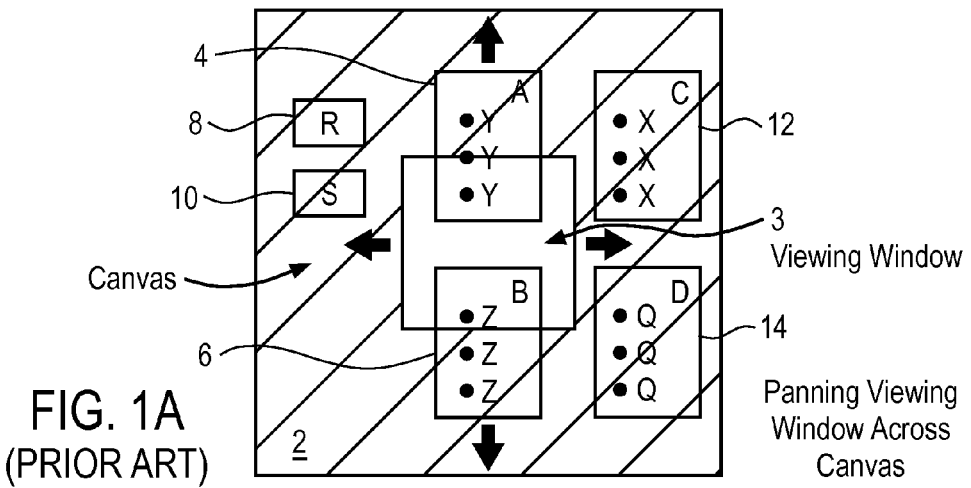
FIG. 1A-1C are an illustrative drawings showing three different portions of a canvas at three different zoom levels viewed through a viewing window.
Figure 1B:
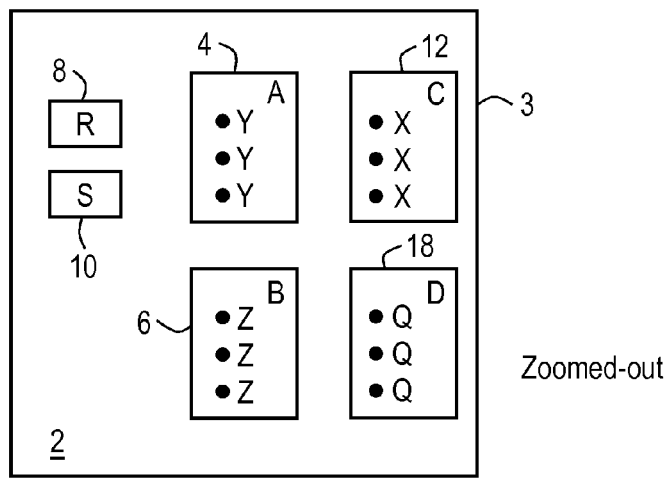
Figure 1C:
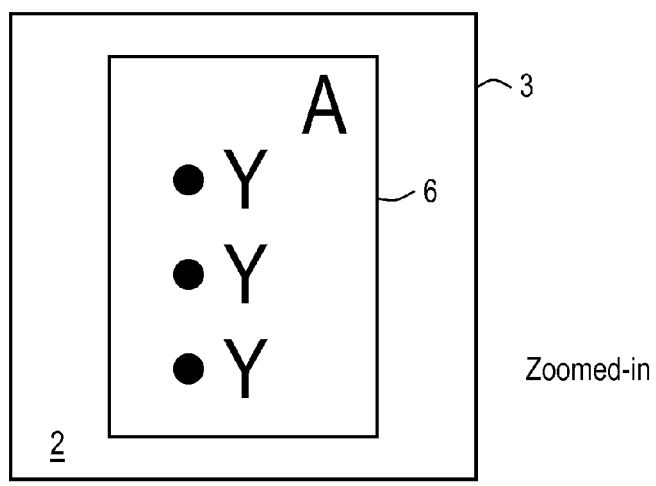

The following description is presented to enable any person skilled in the art to configure a computer system and related method and article of manufacture to add new slides to a presentation in a zooming user interface system. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Identical reference numerals may be used to represent different views of the same or substantially the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

Editing

A user can create display elements on a canvas through use of computer user interface (UI) controls. As used herein, the term 'display element' refers to a computer generated image that is displayed on a portion of a canvas visible on a display screen in the course of a zooming presentation and that, therefore, constitutes a part of the presentation. A display element may include text, image, graphics, shapes, video, animation, hypertext link, other (nested) display elements or other visual components, for example. As used herein the term 'canvas' refers to an abstract space with its own coordinate system on which visual content is presented. A user can use UI controls and edit, resize, rotate and move them around on the canvas through use of computer user interface (UI) controls. A user can define a path between the display elements on a canvas to create a presentation story line. During a typical presentation, a viewing window follows the user-defined path to pan over the canvas to show different display elements in a sequence determined by the path and at different user-defined zoom levels.

Presentation Example

Figure 2:
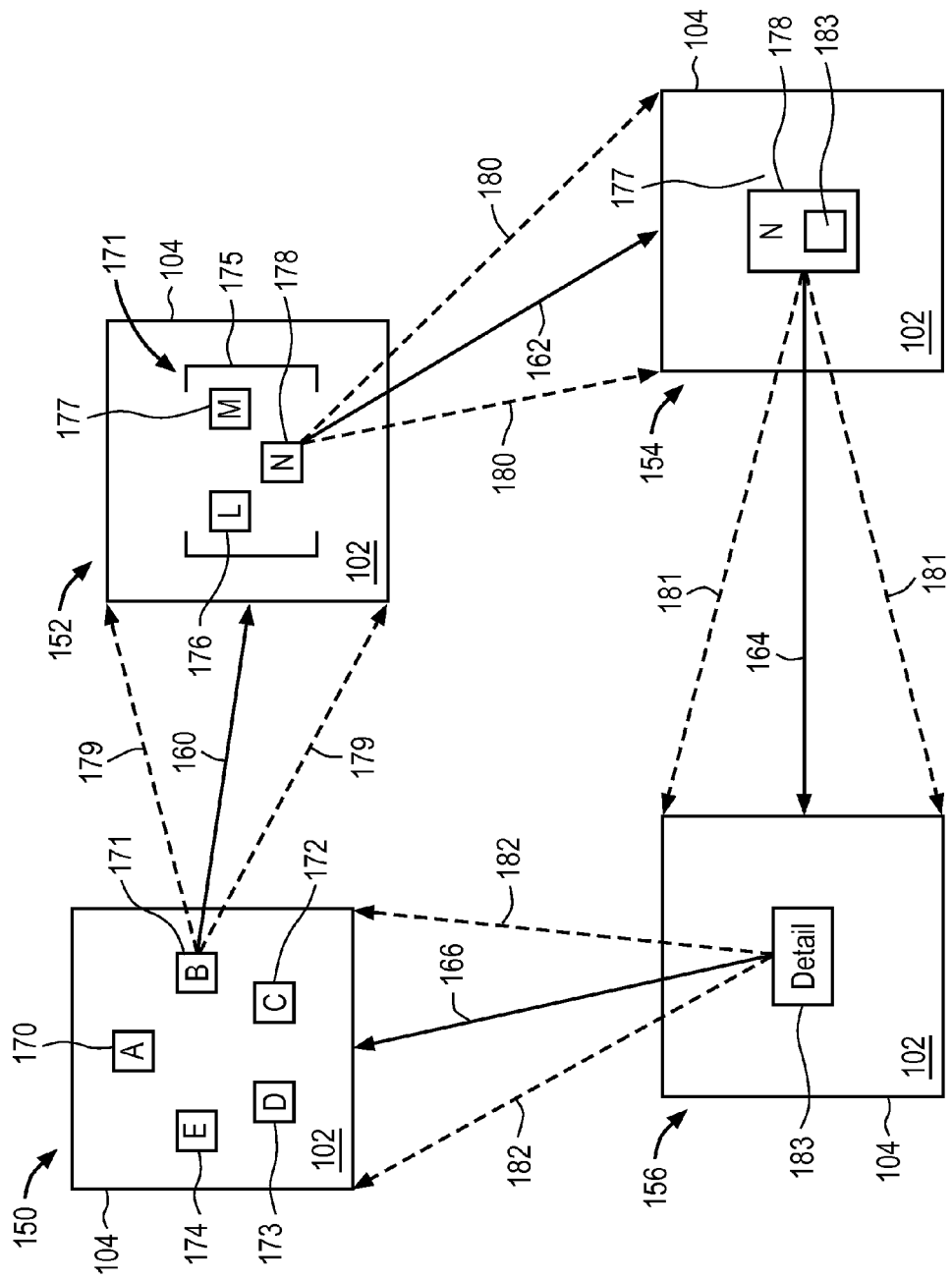
FIG. 2 shows an illustrative sequence of images produced on a display screen during an example presentation in accordance with some embodiments.

FIG. 2 shows an illustrative sequence of images produced on a display screen 104 during an example presentation in accordance with some embodiments. A computer is configured using program code to generate the presentation on the display screen 104. As used herein, the term 'presentation' refers to a process of displaying of a sequence of slides on the device screen through the viewing window in conjunction with displaying panning and zooming involved with traversal of the canvas from one slide to the next. As used herein, the term 'slide' means the image of the canvas visible through the viewing window during a pause in a presentation. A presentation typically involves panning in a continuous motion that may involve laterally in two dimensions' (2D motion) across a canvas, motion as well as zooming (movement in a third vertical-seeming direction), to show a continuous sequence different screen images showing display elements disposed at different 2D locations and at different zoom levels on the canvas. A presentation also typically involves zooming in to and/or zooming out from the canvas to focus upon different display elements at different zoom levels in different slides. It will be appreciated that display elements shown within some slides may be nested within other display elements shown within other slides, and that as a result, some slides may be nested within other slides. Zooming brings into proper focus, in sequence, the larger or smaller display elements encompassed within different slides, for example.

Ordinarily, a presentation pauses briefly at each slide before moving to the next slide. In other words, when a presentation is shown, it proceeds with relatively continuous panning and zooming motions from one slide to the next where the panning and zooming momentarily pauses and a fixed slide is displayed for some prescribed selectable time period, such as 5 or 10 seconds, for example. The pause time generally is selectable, and in some embodiments a user can manually control the duration of the pause. The panning or zooming motion across the canvas during a presentation advantageously allows a user to perceive size (e.g., zoom level) and location relationships among images on the canvas. Through path selection (both 2D motion and zooming level), those physical relationships can be organized to connote relationships among content representing ideas such as a theme or a 'big picture idea' and the related 'detailed ideas', for example. Thus, showing the panning and zooming during a presentation can be used to connote conceptual relationships among content and ideas expressed in different slides.

A presentation created using the ZUI environment is encoded in computer readable code stored in a computer readable storage device and can be used to configure a computer system to show the presentation on a computer display screen. An editing process to create a presentation involves adding a plurality of display elements to a canvas. The editing process also involves defining attributes for individual display elements or groups of display elements such as their size, orientation, location, zoom level and order of order of presentation.

The coordinate system of a 2D (two dimensional) canvas comprises two (2) dimensions, and display elements are displayed at (x,y) coordinate locations designated by a user during an editing mode of operation. Sometimes the coordinate system is referred having 2.5 dimensions due to zooming capability. At any given time, only a portion of the canvas is visible. A user may view portions of a canvas through a viewing window. As used herein 'window' means a boundary about that portion of the canvas that currently is visible on a device display screen. While viewing the canvas through a viewing window, users can pan across the canvas in two dimensions and zoom into objects of interest. In other words, a user can move the viewing window in (x,y) directions to display different regions of the canvas and can cause the generated display to zoom in on details of the canvas image within the window or zoom out from details of the canvas image within the window. The use of a canvas and a viewing window allows for non-linear presentations, the option to present richer detail of content, and to give a better overview and understanding of complex visual messages and relations. For example, as a user zooms into a text object it may be represented as a small dot, then a thumbnail image of a page of text, then a full-sized page and finally a magnified view of the page.

Referring again to FIG. 2, the example presentation includes a sequence of slides 150-156 showing display elements produced on the display screen 104. Each slide, i.e., the computer generated image on a device display screen, shows that portion of the canvas that currently visible within the viewing window. From a user's perspective, the screen display is the viewing window. Collectively, the sequence of slides 150-156 constitute a show or presentation in which a first slide 150 is first presented followed by a second slide 152, followed by a third slide 154 followed by a fourth slide 156, followed again by the first slide 150. The example presentation involves zooming, which is illustrated using path segments that indicate zooming transitions from one screen display to the next. The direction of the show follows a sequence of path segments 160-166 in which the first three path segments 160-164 involve transitions to successively more zoomed-in views of display elements on the canvas 102 (e.g., to show smaller details) and in which the fourth path segment 166 involves a transition to a more zoomed-out view of the canvas 102 (e.g., to show a bigger perspective). It will be appreciated that path segments represent computer code data structures encoded in a storage device that indicate the order of transitions among views in the presentation shown on the display screen 104, but they are not visible in the actual presentation.

The example presentation generates the example first slide 150 in which display element 169 and display elements 170-174, are visible. Display elements 170-174 are included within display element 169. As indicated by dashed lines 179, the presentation next presents the second slide 152. It will be noted that in this example that as the presentation transitions from slide 150 to slide 152 it zooms in on display element 171 which becomes the example second slide 152. In other words, during one of the pauses in the presentation, the display element 171 encompasses the entire viewing window, and therefore, acts as a slide during that pause. It will be appreciated that between pauses during a presentation, as the viewing window pans and/or zooms, different intermediate regions of the canvas are displayed between slide as the window moves in a continuous motion from one slide to the next.

Thus, the second slide 152 is a zoomed in view of the display element 171, which in this example, is associated with a frame 175 (which may not be visible during the presentation) that groups together additional display elements 176-178. In some embodiments, a frame structure such as frame 175 acts as a point of focus for zooming during the presentation. The above-mentioned patent application Ser. No. 13/298,523 describes frame structures in accordance with some embodiments. A frame structure is used in some embodiments to control display elements as a unit that are grouped within the frame structure. Controlling display elements as a unit that are grouped within a frame structure includes translating (i.e. moving across the space), zooming, rotating and/or displaying all of the grouped display elements in unison, for example. Grouping with frames forms no part of the present invention, however, and will not be described further herein.

As indicated by dashed lines 180, the presentation next presents the example third slide 154 that zooms in to focus on display element 178. The zoomed in view of display element 178 includes detail region 183 that was too small to be visible in first slide 150. As indicated by dashed lines 181, the presentation next presents the fourth slide 156 that zooms in to focus in to and to show more detail and/or increased size of the region 183 of display element 178. The zoomed in view of display element 183 in the example fourth slide 154 shows details that were too small to be visible in third slide 154. As indicated by dashed lines 182, the presentation next zooms out to focus again on the first slide 150. Thus, the illustrative presentation viewing window zooms in on the canvas 102 as the presentation moves from slide 150 to 154 to focus on progressively smaller size details of selected display elements and then zooms back out again from the canvas as the presentation moves from the fourth slide 156 back to the first slide 150.

Figure 3:
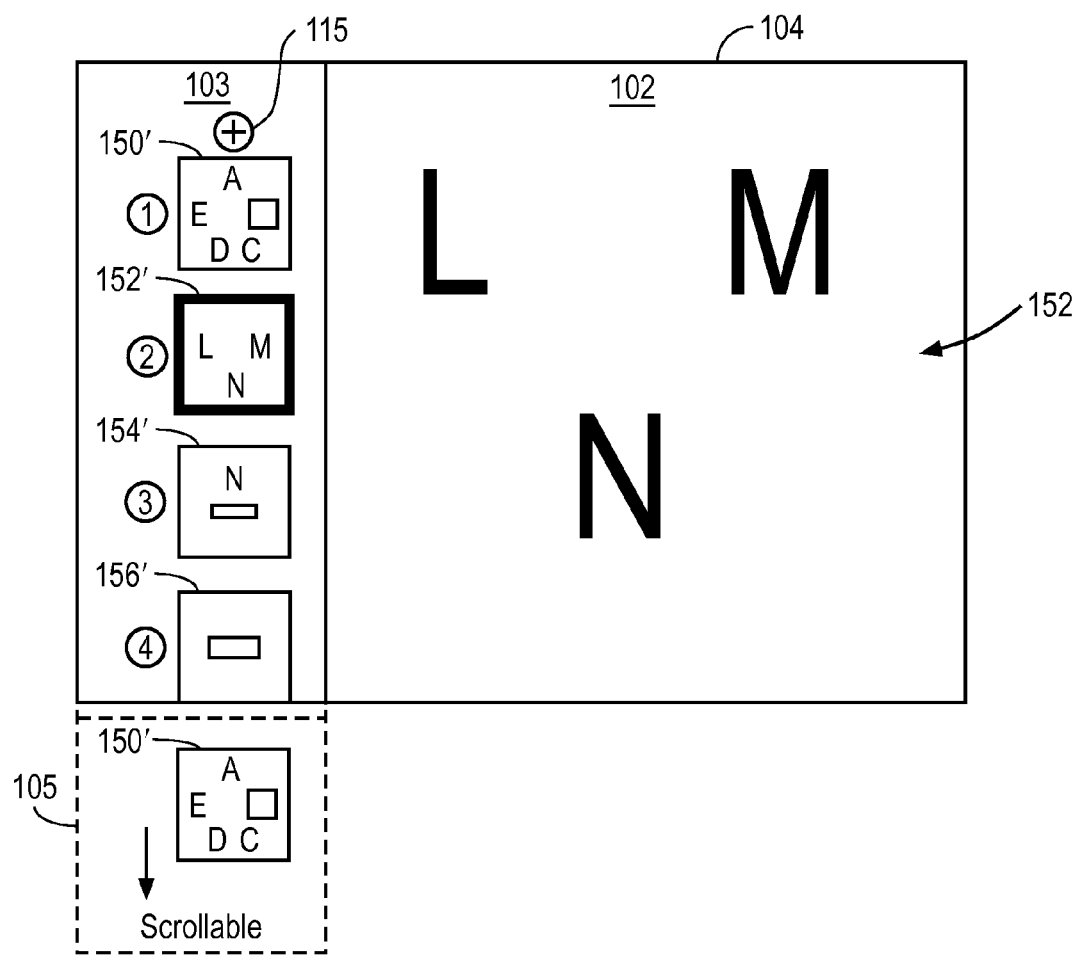
FIG. 3 is an illustrative drawing representing a display screen displaying a a zoomable canvas region in which a presentation can be displayed and that includes a control panel region in which thumbnail images are shown of slides shown on the canvas during the presentation in accordance with some embodiments.

User Interface with Thumbnail Images Corresponding to Screen Images Produced During a Presentation on a Zoomable Canvas FIG. 3 is an illustrative drawing representing a display screen 104 displaying a computer generated user interface 100 that includes a zoomable canvas region 102 in which a presentation can be displayed and that includes a control panel region 103 in which thumbnail images are shown of screen images shown on the canvas during the presentation in accordance with some embodiments. A thumbnail image includes a reduced size representation of an image. In the illustrative drawing of FIG. 3, the example second slide 152 is shown on the canvas 102. The control panel region 103 includes first through fourth thumbnail images 150'-156', which correspond to screen images 150-156. The display of thumbnail image 152' in the control panel 103 is highlighted to indicate its correspondence with the slide 152 currently displayed on the canvas. In the illustrative example of FIG. 3, the thumbnail images are ordered in the control panel 103 according to the order in which their corresponding slide s are shown in the presentation. However, in some embodiments, thumbnail images are initially ordered in the order in which they are added, and their ordering can be changed later to match the order in which corresponding slides are displayed during a presentation. Numbers (1, 2, . . . , N) adjacent thumbnail images in the control panel 103 indicate the presentation order in which corresponding slides are shown in the presentation show. The control region 103 is scrollable. Dashed lines 105 encompass another occurrence of thumbnail image 150', which is not currently displayed within the control panel 103, but which can be made visible within the control panel 103 through scrolling. In other words, as shown in FIG. 2, the presentation represented by FIG. 3 circulates back to slide 150 following slide 156. It will be appreciated, as explained more fully below, that a presentation may include numerous slides and that scrolling through the thumbnail images can be used to navigate among slides in the presentation.

Information Structure in Storage Device Corresponding to Thumbnail Images and Screen Images Table 1 represents data structure information stored in a computer readable storage device corresponding to the example thumbnail image displayed within the control region 103 shown in FIG. 3 in accordance with some embodiments. The (x, y) locations represent 2D locations in the canvas. The zoom level indicates how much 2D space is visible in a slide screen image and the level of detail that can be discerned. In this example, a lower zoom level, e.g., 2, indicates less zoomed in, which means that a greater area of the canvas is visible but at a lower level of detail or resolution. Conversely, a higher zoom level, e.g., 9, indicates more zoomed in, which means that a greater area of the canvas is visible but at a higher level of detail or resolution. It will be appreciated that the numeric zoom levels in the table are examples selected for illustrative purposes. Moreover, it will be appreciated that an information structure in machine storage corresponding to Table 1 may include references to actual position and zoom levels, which may be associated with the presentation that the thumbnail images correspond to.

TABLE 1

| Order Number | (x, y,) position | Zoom level Zoom Ratio (GZR, SZR) |
| --- | --- | --- |
| 1 | $(x_1, y_1,)$ | GZR1, SZR1 |
| 2 | $(x_2, y_2,)$ | GZR2, SZR2 |
| 3 | $(x_3, y_3,)$ | GZR3, SZR3 |
| 4 | $(x_4, y_4,)$ | GZR4, SZR4 |
| 5 | $(x_1, y_1,)$ | GZR5, SZR5 |

Thus, the thumbnail images within the control panel allow a user to specify the image to display that is at a particular 2D (x, y) canvas location and zoom ratio.

Zoom Ratio

In general, an object can be displayed in a canvas at different sizes. A global reference system is used to provide an indication of the size at which an object is displayed on the canvas.

For example, an object may have a size of 300×300 pixels, but it that object is displayed at 400×400 pixels, then the image must be enlarged algorithmically. If the object image is 800×800 pixels then the image must shrink it in order to display it in a 400×400 pixel. In this above example the first image would have a screen zoom ratio of 400/300=1.33333, and the second would have 400/800=0.5.

Assume, for example, that a new slide—or shape, textbox, any object is added to the canvas. It's zoom ratio to the world coordinate system will be one. This basically means, that it's at its original size. It's zoom ratio to the screen will also be one, since it's displayed in its original size on the screen as well. So (OBJ1: global zoom ratio (GZR): 1.0, screen zoom ratio (SZR): 1.0)

When an object is inserted into a document it will always appear the same size compared to the screen.

If one zooms in to the object, the objects added will appear larger. So OBJ1: GZR: 1.0 SZR: >1.0

If a new object is now added, it will appear the same size compared to the screen, but it will be smaller then OBJ1. So OBJ2: GZR: <1.0, SZR: 1.0.

Now, assume a zoom out and zoom out again. Following such zoom out, both OBJ1 and OBJ2 appear smaller than when they were added to the canvas:

OBJ1 GZR: 1.0, SZR: <1.0

OBJ2 GZR <1.0, SZR: <1.0

Now, assume that another new object is added. This other new object will appear the same size compared to the screen as all objects did at the time of addition. However, we are zoomed out, so the other objects appear smaller, so OBJ3 will appear larger than they do.

OBJ3: GZR: >1.0, SZR: 1.0
OBJ1 GZR: 1.0, SZR: <1.0
OBJ2 GZR <1.0, SZR: <1.0

To sum it up: OBJ3 is larger than OBJ1, which is larger than OBJ2. That is the information captured by the GZR, the global zoom ratio.

OBJ3 is displayed at its original size on the screen. Should OBJ3 be an image of size 400×400 pixels, it takes up exactly 400×400 pixels on the screen at this point.

Should OBJ1 and OBJ2 also be images of the same size, they both take up less than 400×400 pixels on the screen at this point.

Placement of New Slides within the Canvas

Slides are created during an editing process in which a presentation is created. In some embodiments, a slide may be first created and then display elements can be added to the slide. In other words, a region of the canvas is designated as a slide, and that slide region will be displayed as a screen image while the presentation pauses momentarily. Alternatively, display elements that already are a part of the canvas can be designated as being encompassed by a slide. For example, during editing, a 'frame' can be designated to surround one or more display elements, and the region of the canvas surrounded by the frame can be designated as a slide that will be shown as a screen image during a momentary pause in a presentation.

Choosing a location at which to place new slides within the canvas can be a significant issue during creation of new slides. As explained above, a presentation involves panning and zooming within the canvas. As a result, it is not uncommon for a user who is developing a new presentation to become temporarily 'lost' among the display elements and slides on the canvas. One approach to easing the task of placing slides without becoming lost is to provide criteria to be evaluated that take into account prior slides when placing new slides. In general, criteria in accordance with some embodiments, seek to place new slides in patterns that are consistent with the placement of prior slides to makes it easier for a user to locate a newly placed slide on the canvas. One factor is that, in general, it is desirable to avoid placing new slides over pre-existing display elements (including over pre-exising slides) on the canvas. Another factor is that it can be desirable to take into account a user's recent slide creation pattern in terms of one or more of zoom level, 2D canvas location and orientation, for example, when placing a new slide so as to continue that pattern. Moreover, often it is desirable in determining new slide placement within the canvas, to take into account the zoom level at which a user is viewing the canvas at the time of new slide creation and the particular 2D location of the canvas the user is viewing at the time of new slide creation.

Figure 4:
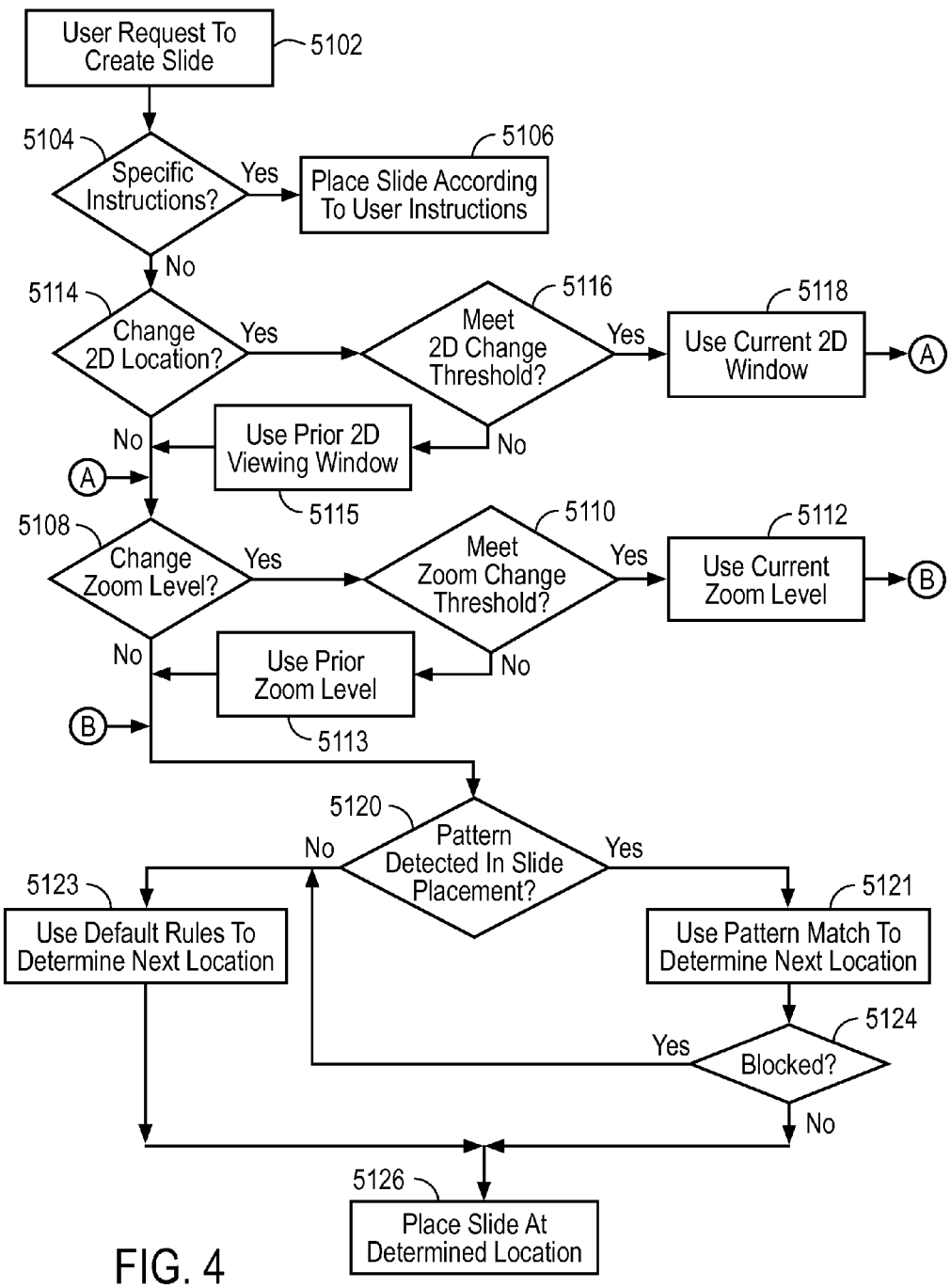
FIG. 4 is an illustrative flow diagram representing a process for the placement of slides for use in a presentation on a canvas within a zooming user interface in accordance with some embodiments.

FIG. 4 is an illustrative flow diagram representing a process for the placement of slides for use in a presentation on a canvas within a zooming user interface in accordance with some embodiments. Module 5102 detects a user input request to create a new slide within the canvas. The request may involve a user's imparting of an input to create a new slide by a user's actuation of a "+ Add" button 115 within the control panel region 103. Alternatively, a user may an input to create a new slide using a UI point and select control device (not shown) such as computer mouse, for example. Thus, in some embodiments, a user can create a new slide using the "+ Add" button without providing any specific indication as to the location of the new slide, and alternatively, a user may employ a UI device to provide a user designated location on the canvas and zoom level where the new slide is to be created.

Decision module 5104 configures the computer to determine whether the user has provided specific canvas placement instructions such as a 2D location, zoom level and orientation in association with the request to add a new slide. In response to a determination that the user has provided specific placement instructions in association with the request for the addition of a new slide ('yes' branch), module 5106 configures the computer to place the slide in accordance with the user's specific placement instructions.

In response to a determination that specific placement instructions are not provided in association with the new slide creation request, decision module 5114 configures the computer to determine whether the user has changed the zoom level of the canvas display since the addition of the immediate previously added slide. In response to a determination that the zoom level has changed ('yes' branch), decision module 5110 configures the computer to determine whether the zoom level changed meets one or more prescribed thresholds. In response to a determination that the zoom level has changed by at least a prescribed threshold ('yes' branch), module 5112 configures the computer to use the currently displayed zoom level for the newly added slide and to use the current viewing window as the reference viewing window for use in placement of the new slide. Control next flows to decision module 5108 described below. On the other hand, in response to a determination by decision module 5110 that the zoom level has not changed by the prescribed threshold amount ('no' branch), module 5115 configures the computer to use the previous viewing window in which the immediate previously placed slide was placed as the reference viewing window for use in placement of the new slide. Control flows to decision module 5108. In some embodiments, both a prescribed zoom-in threshold amount is selected and a prescribed zoom-out threshold amount is selected to be indicative of a user's desire to create a new slide at either a new zoom-in (closer in) level or a new zoom-out (farther away) level. It will be understood, for example, that a user may zoom in to an area of the canvas to take a closer more detailed look at smaller sized display elements, but with the intent to create a next slide at the same zoom level as the immediate previously created slide. Thus, in some embodiments, if the change in zoom level involves a relatively small zoom-in, less than a prescribed first zoom-in threshold, then decision module 5116 determines that the prior zoom level should be used. Conversely, if the change in zoom level involves a very large second zoom-in, more than a prescribed zoom-in threshold, then decision module 5116 determines that the prior zoom level should be used.

It also will be understood, for example, that a user may zoom-out from an area of the canvas to gain a bigger picture broader perspective look a larger region of the canvas, but with the intent to create a next slide at the same zoom level as the immediate previously created slide. Thus, in some embodiments, if the change in zoom level involves a relatively large zoom-out, greater than a prescribed zoom-out threshold, then decision module 5116 determines that the prior zoom level should be used.

As explained more fully below with reference to FIGS. 5A to 5C-2, a determination of the reference viewing window determines which, if any, previously placed slides should be referenced in determining a 2D placement and/or an orientation placement of the new slide.

In response to a determination by decision module 5114 that the zoom level has not changed ('no' branch) or in response to module 5115 that the previous zoom level should be used for the new slide, control flows to decision module 5108.

Decision module 5114 configures the computer to determine whether the user has changed the 2D region of the canvas displayed within the viewing window. In response to a determination by decision module 5108 that the 2D position of the viewing window has changed ('yes' branch), decision module 5110 determine whether the user has changed the 2D region of the canvas displayed within the viewing window by some prescribed 2D threshold amount. The prescribed 2D threshold change may be a function of zoom level, e.g., the greater the zoom-in level the less the 2D change required to meet the 2D threshold change, for example. In response to a determination by decision module 5110 that the 2D location has changed by at least the 2D threshold amount ('yes' branch), module 5112 configures the computer to use the current viewing window as a reference viewing window in which to identify one or more reference slides for use in determining placement of the new slide. Control next flows to decision module 5120 described below.

On the other hand, in response to a determination by decision module 5110 that the 2D location of the viewing window has not changed by at least the 2D threshold amount ('no' branch), module 5113 configures the computer to use the to use the previous viewing window in which the immediate previously placed slide was placed as the reference viewing window for use in placement of the new slide. Control next flows to decision module 5120 described below.

It will be appreciated that these reference slides and any other display elements encompassed by the reference viewing window comprise contents of the reference viewing window.

Module 5120 configures the computer to determine whether placements of prior slides on the canvas (2D canvas location, zoom level and/or orientation) within the reference window follow a pattern. As explained more fully below, modules 5108-5118 determine the reference window used by module 5120. In some embodiments, a slide placement pattern is determined as a function of information in information structures (such as ones like that in Table 1) corresponding to previously added thumbnail images and slides. Information contained within information structures of adjacent thumbnail images is compared and evaluated to determine whether there is a pattern to the placement of successive slides. For example, a placement pattern could involve placement of each successive slide in a diagonally upward direction relative to a prior slide; or could involve a fixed increase in zoom level of each successively added slide; or could involve a in angular orientation of each subsequently added slide.

In response to a determination by module 5120 that prior slides were added in some pattern ('yes' branch), module 5121 uses previous slides within the determined reference viewing window as reference slides to determine a next location at which to add the new slide in accordance with the pattern. Persons skilled in the art will understand how to make such determinations by analyzing the placement of subsequently added frames/slides. Interpolation and extrapolation are specific mathematic approaches which may or may not be employed in the process, for example.

More specifically, for example, in a user preferences discovery mode of operation, module 5121 collects information as to one or more of zoom levels, 2D locations and orientations of two or more previously added slides. In some embodiments, the module 5121 accesses information structures corresponding to previously added slides within the determined reference window, such that the information structure described with reference to Table 1, to determine placement information for previously added slides such as 2D canvas location, zoom level and orientation. In some embodiments, module 5120 determines as a function of the prior slide placement information whether a succession of changes in zoom levels indicates a pattern, and if so assigns a zoom level to the new slide that fits the pattern. More particularly, in some embodiments, module 5121 determines whether a succession of changes in 2D canvas locations of recently added slides indicates a pattern, and if so, assigns a 2D canvas location to the new slide that fits the pattern. Moreover, in some embodiments, module 5121 determines whether a succession of changes in zoom levels for recently added slides indicates a pattern, and if so assigns a zoom level to the newly added slide that fits the pattern. In some embodiments, module 5121 determines whether a succession of changes in slide orientations of recently added slides indicates a pattern, and if so assigns an orientation to the newly added slide that fits the pattern.

Decision module 5124 determines whether placement of the new slide is blocked by a previously created display element. In response to a determination by decision module 5124 that the new slide placement is not blocked ('no' branch), control flows to module 5126, which places the new slide in the canvas.

In response to a determination by decision module 124 that the new slide placement is blocked ('yes' branch) or in response to a determination by decision module 120 that there is no pattern, control flows to module 5123.

Module 5123 configures the computer to determine a placement for the new slide in accordance with one or more default rules. The default rules use one or more previously created slides within the reference viewing window determined by modules 5108-5118 to determine where to place a newly created slide. More particularly, for example, in accordance with a first default rule, a newly created slide is placed inside a previously created slide if that previously created slide encompasses the entire current entire viewing window. In accordance with a second default rule, a newly created slide is placed either horizontally adjacent to or above or below or nearby a previously added slide. The actual placement (e.g. horizontally adjacent to the left or to the right or vertically above or below) relative to the previously placed slide is a function of 2D placements of previously added slides. In accordance with a third default placement rule, a newly created slide is added to a location that is not blocked by a previously added display element including previously added slides. It will be appreciated that these default rules are prioritized and applied in a complementary manner. A newly created slide that is created within another slide pursuant to the first rule is not determined to be blocked pursuant to the third rule. Moreover, for example, when placing a slide on the canvas, an assumption is made that an object at the same zoom level as the slide—or to put it differently, an object with a scale in the same range as the slide, should either be fully encompassed or fully excluded from the automatically placed slide. Thus, placement should be made so as to avoid placing slides so that they overlap.

Control next flows to module 5126, which places the new slide on the canvas. Thus, module 5126 can place the new slide on the canvas pursuant to a placement determination of pattern determination module 5121. Alternatively, module 5126 can place the new slide on the canvas pursuant to a placement determination of default placement module 5123. The following are illustrative examples of application of these slide placement rules.

Example—Changes in Reference Viewing Windows

Figure 5A:
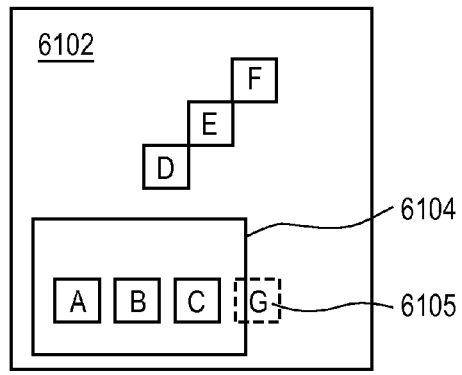
Figure 5B:
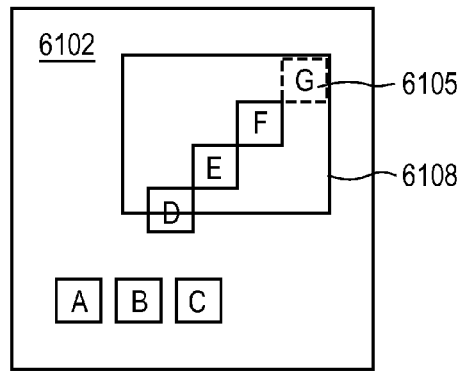
Figures 2, 5C:
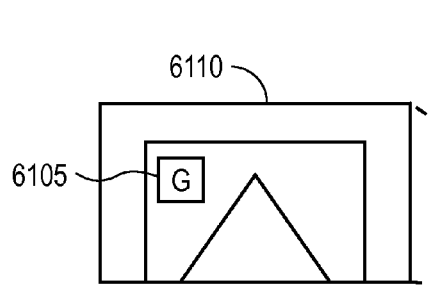

FIGS. 5A-5C-2 are illustrative drawings representing changes in canvas locations visible through a viewing window in accordance with some embodiments. FIGS. 5A-5C-2 show canvas 6102 in which in which six slides A-F were placed previously. FIG. 5C-2 shows details of the zoomed-in viewing window in FIG. 5C-1. Assume in these examples that slide C is the most recently placed slide, that reference window 6104 is the reference window that was visible when slice C was added and that slide G 6105 is a slide that is placed in accordance with the process of FIG. 4.

Referring to FIG. 5A, a 'current' viewing window 6104 displays slides A-C. Assume that module 5110 determines that the viewing window 6104 has not changed 2D location by an amount that meets a threshold. Thus, in accordance with some embodiments, the viewing window 6104 acts as a reference viewing window that is used in determining placement of the new slide G 6105. Modules 5121 and/or 5123 determines a placement for slide G 6105 in accordance with one or more placement rules. More particularly, slides A, B, C within the reference viewing window 6104 are used as reference slides in the placement of new slide G 6105, for example.

Referring to FIG. 5B, a 'current' viewing window 6108 displays slides D-F. Assume that module 5110 determines that the viewing window has changed 2D location by an amount that falls meets a threshold. Thus, in accordance with some embodiments, the viewing window 6108 acts as a reference viewing window to determine placement of the new slide G 6105. Module 5121 and/or 5123 determines a placement for slide G 6105 in accordance with placement rules. Specifically, slides D, E, F within the reference viewing window 6108 are used as reference slides in the placement of new slide G 6105, for example.

Figures 1, 5C:
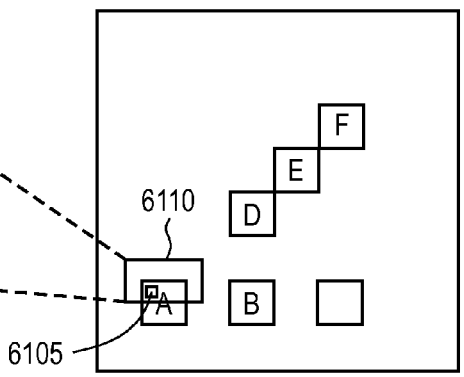

Referring to FIG. 5C-1-5C-2, a 'current' viewing window 6110 is zoomed in to show only a portion of slide A. FIG. 5C-1 shows a larger perspective of the canvas 6102 to show the relative position and zoom level of the current viewing window 6110. FIG. 5C-2 shows a zoomed in view of the current viewing window 6110. Assume that module 5116 determines that zooming level has zoomed in by an amount that meets a prescribed zoom-in change threshold. Thus, in accordance with some embodiments, the zoomed in level of viewing window 6110 acts as a reference window with a reference zoom-in level to determine placement of the new slide G 6105. Module 5121 or 5123 determines a placement for slide G 6105 in accordance with placement rules. Note that in FIG. 5C-2, the new slide G is placed over the slide A even though slide A takes up less than the entire reference viewing window. In some embodiments, a default placement rule holds that a new slide can be placed over a previous slide if the previous slide takes up at least a prescribed amount of the reference viewing window. Thus new slide G 6105 is placed inside slide A, for example.

Example—Pattern Matching and Slide Placement

In general, for example, once a preset zoom threshold is reached—practically, once the slide is at least of comparable size to the viewport or larger the zoom ratio for the newly placed slide becomes a variable which ensures that it takes up a preset ratio of the currently visible area of the canvas. If that part of the canvas is covered by a larger slide already, then the borders of that slide act as borders to the area the new slide can be placed on. If there are already slides placed within the larger slide—in this case slide A I suppose—then the size of the newly placed slide will be matched to those, provided their size is within a given range of zoom ratios. Practically this means that their whole area is smaller than some percentage of the entire viewport and they are larger than some percentage of the entire viewport. To put it as simply as possible, the point is, to align with the size of existing slides within slide A, if those are also within the acceptable zoom ratio range for the given viewport. Neither too big, nor too small to be meaningfully editable there.

Figure 6A:
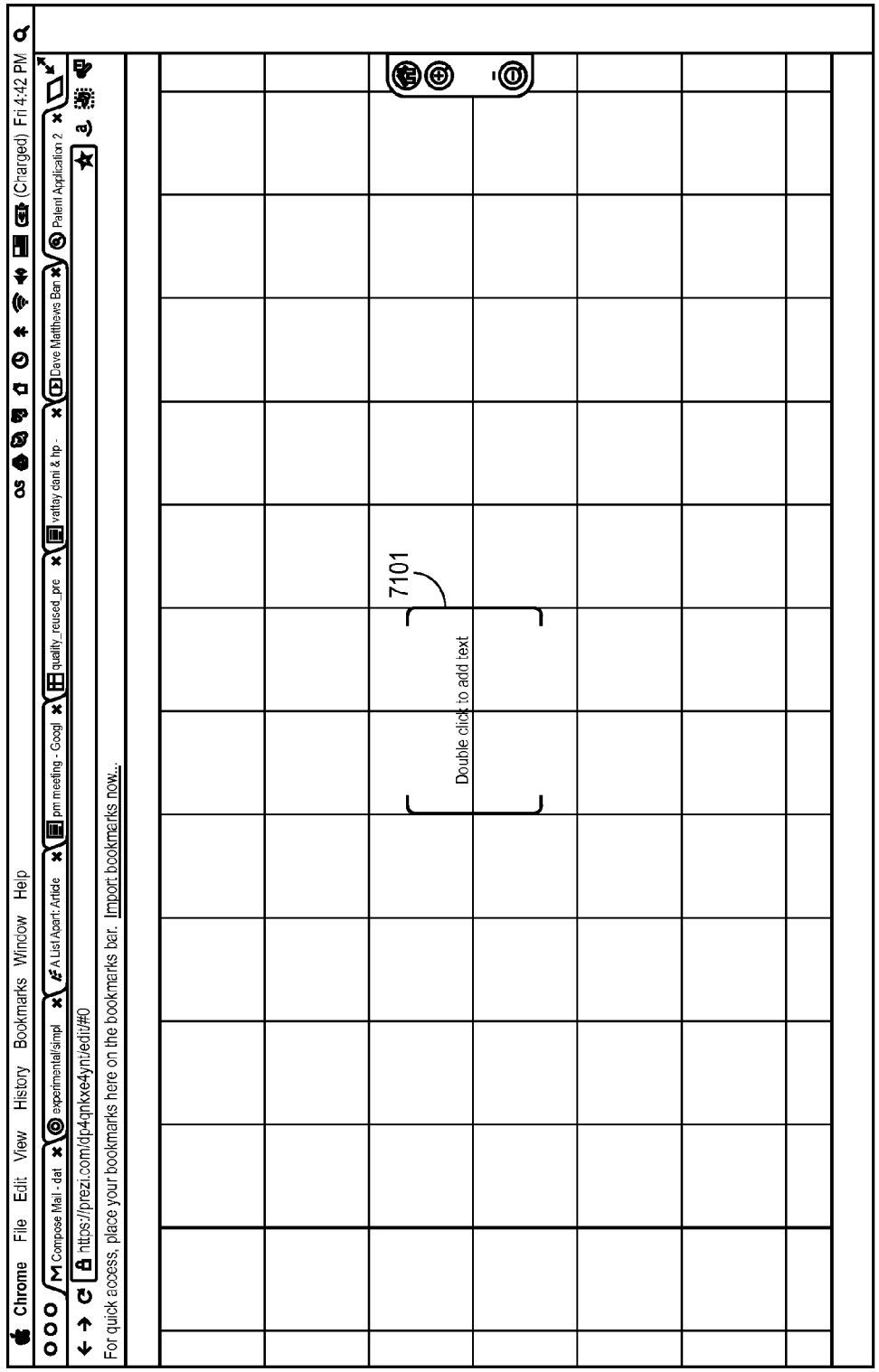
FIGS. 6A-6C are illustrative drawings of a display screen showing slides placed on a canvas locations according to a pattern in accordance with some embodiments.
Figure 6B:
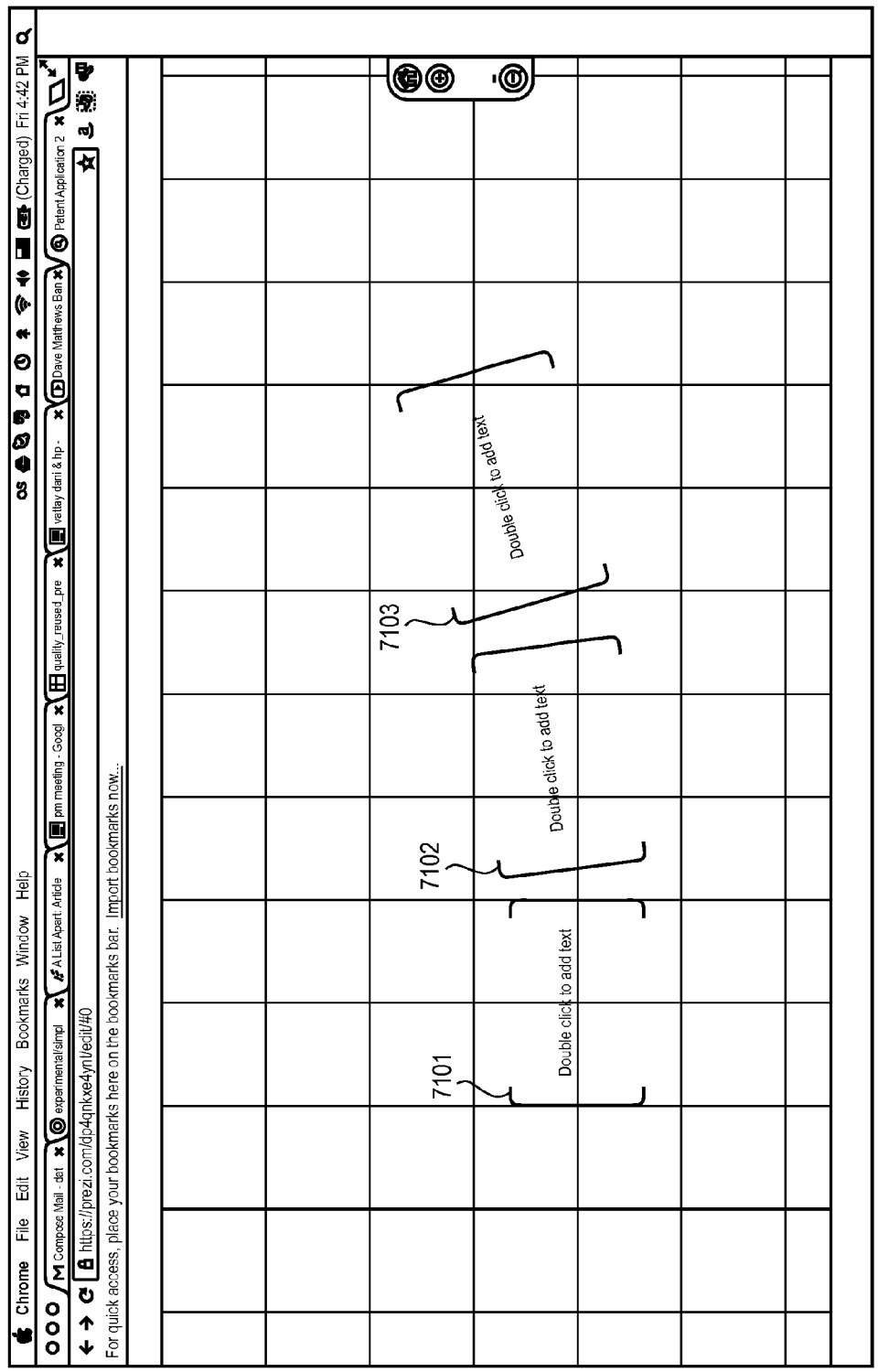
Figure 6C:
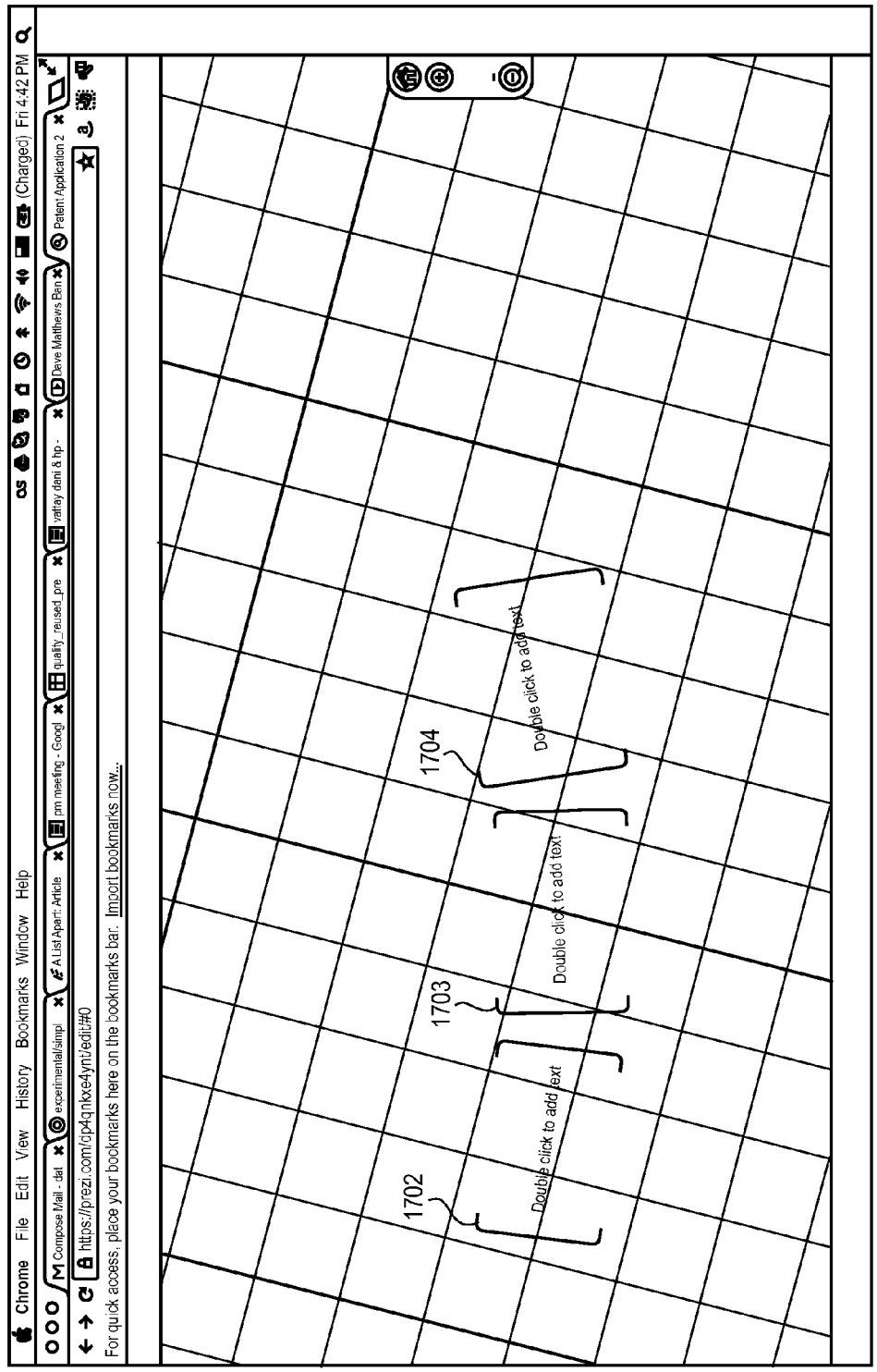

FIGS. 6A-6C are illustrative drawings of a device display screen slides placed on a canvas according to a pattern in accordance with some embodiments. It will be appreciated that this is an example of adding slides in accordance with module 5121 of FIG. 4. FIG. 6A is an illustrative drawing of the device display screen that shows a single first slide displayed in the middle of the display screen. In some embodiments, in the absence of user input as to placement, orientation and zoom level, an image of a first slide in a presentation is generated using default placement, orientation and zoom level. In some embodiments, a default placement of the first slide 7101 on the canvas using module 5123 is at a prescribed location which is at a center of a portion of the canvas that is visible on the display screen. In accordance with some embodiments, each time a new slide is added, the viewing window may be shifted so that that new slide is displayed at the center of the viewing window. It will be appreciated that placement of each new slide at the center of the viewing window may require a slight shift in the reference viewing window. In this example, a message "Double click to add text" that is shown within the example first slide of FIG. 6A acts as an editing message instructing a user how to add text details to the slide in accordance with some embodiments. The illustrative message indicates that a portion of the screen associated with the message itself acts as a user selectable UI editing control. Thus, it will be appreciated that a user can edit a slide after the slide has been displayed upon the display screen and added to a presentation.

FIG. 6A is an illustrative drawing of the device display screen that shows three slides 7101-7103 that are displayed adjacent each other aligned along an (invisible) arcuate path such that the angular orientation of the slides relative to horizontal increases from one slide to the next proceeding from left to right along the arcuate path and in which the zoom level is the same for all three slides. Assume that the first slide 7101 was added at a default location of the canvas as explained above. Further, assume that decision module 5104 determines that a user added a second slide 7102 adjacent the first slide and that in doing so, the user explicitly indicated canvas location and orientation of the second display relative to the first slide. For example, in some embodiments, the user uses one of the various UI controls, such as a pointing and selection device such as a computer mouse (not shown), which will be readily understood by persons skilled in the art and need not be described herein, to add a new slide to the canvas and to explicitly edit the new slide to modify its exact place, scale and orientation. The second slide 7102 is displayed on the device screen at the prescribed location in the center of the screen. The canvas location of the second slide 7102 relative to the first slide 7101 is indicative of the arcuate path. The orientation of the second slide 7102 relative to the first slide 7101 is indicative of a change in orientation from one slide to the next along the path. The zoom level of the second slide 7102 relative to the first slide 7101 is indicative of a fixed zoom level for slides along the path. Moreover, assume that a user adds the third slide 7103 without explicitly indicating location, orientation or zoom level by using thumbnail "+Add" button, for example. Slide 7102 is the reference slide for the placement of new slide 7103. Pursuant to pattern matching module 5121 the third slide 7103 is automatically displayed at a canvas location adjacent the second slide on the arcuate path and with an orientation relative to the second slide that matches the orientation of the second slide relative to the first slide and at the same zoom level as the first and second slides.

FIG. 6C is an illustrative drawing of the device display screen that shows the addition of a fourth slide 7104 aligned along the (invisible) arcuate path. Assume that a user adds the fourth slide 7104 without explicitly indicating location, orientation or zoom level. Slide 7103 is the reference slide for the placement of new slide 7104. Pursuant to pattern matching module 5121 the fourth slide 7104 is automatically displayed at a canvas location adjacent the third slide 7103 on the arcuate path and with an orientation relative to the third slide 7103 that matches the orientation of the third slide 7103 relative to the second slide 7102 and at the same zoom level as the second and third slides 7102, 7103.

Example—Zoom level Changes and Slide Placement

Figure 7A:
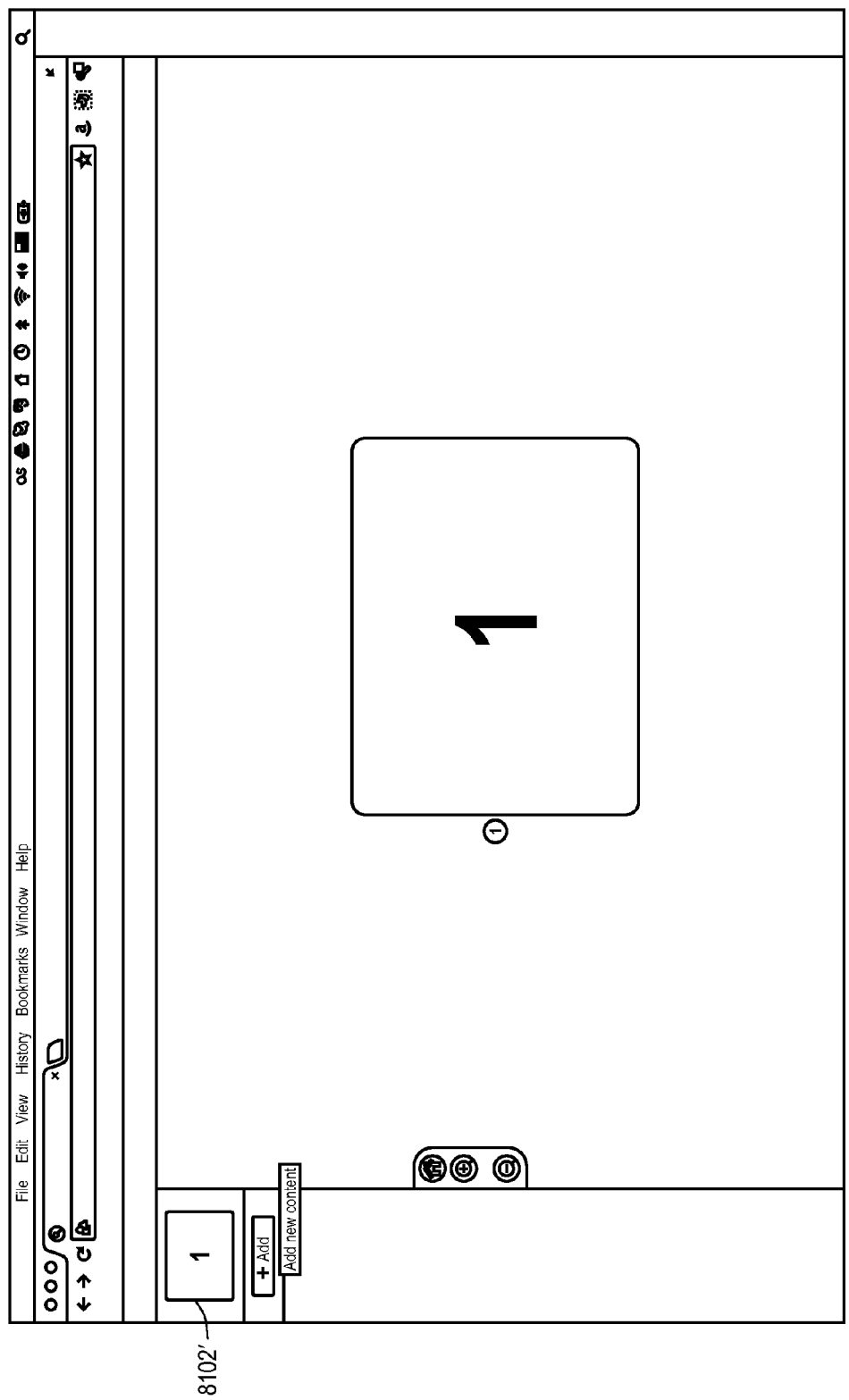
FIGS. 7A-7N are illustrative drawings of a display screen that show user controlled changes in zoom level in the course of adding slides to a canvas and that show an example of the impact of such zooming level changes in accordance with some embodiments.
Figure 7B:
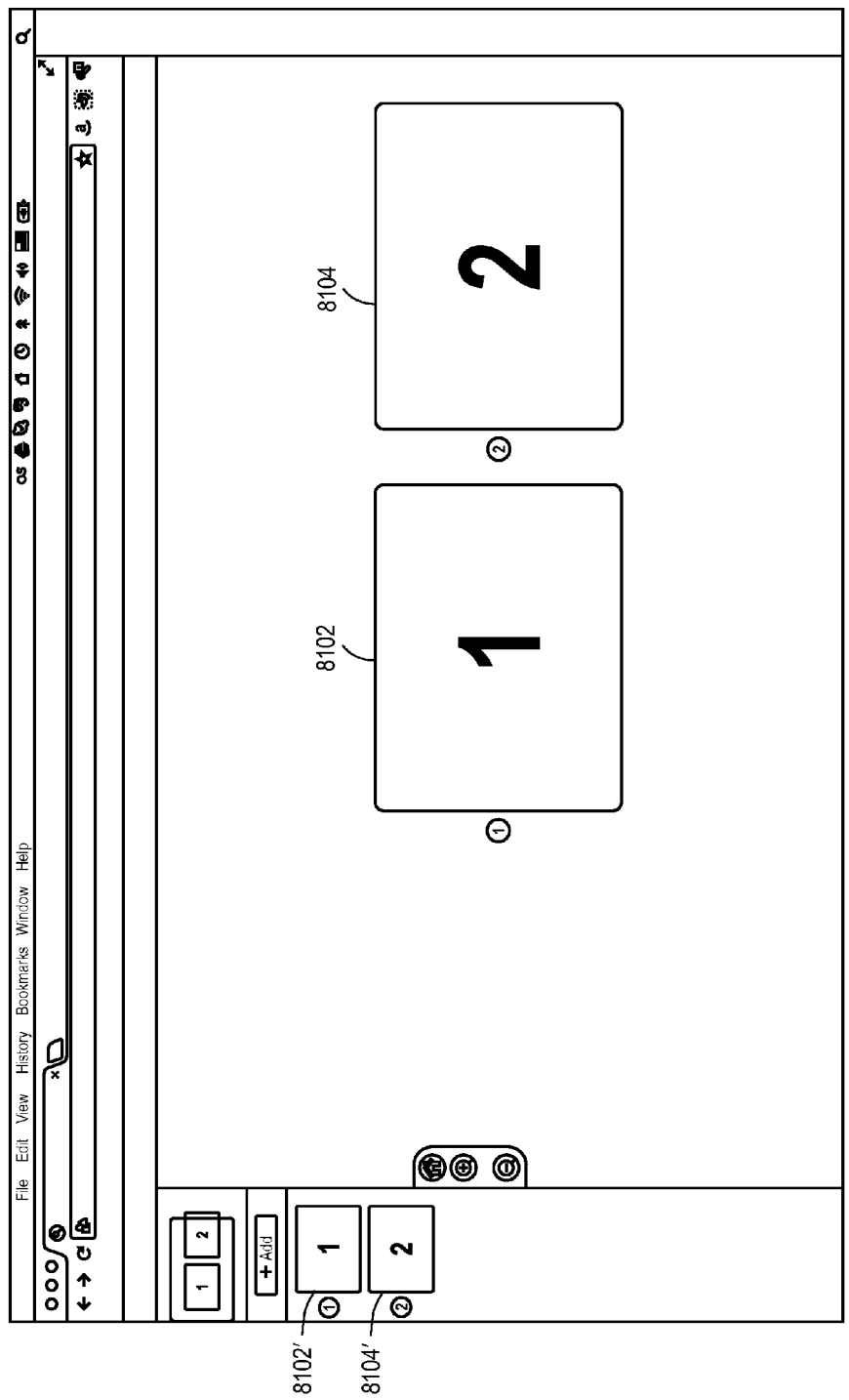
Figure 7C:
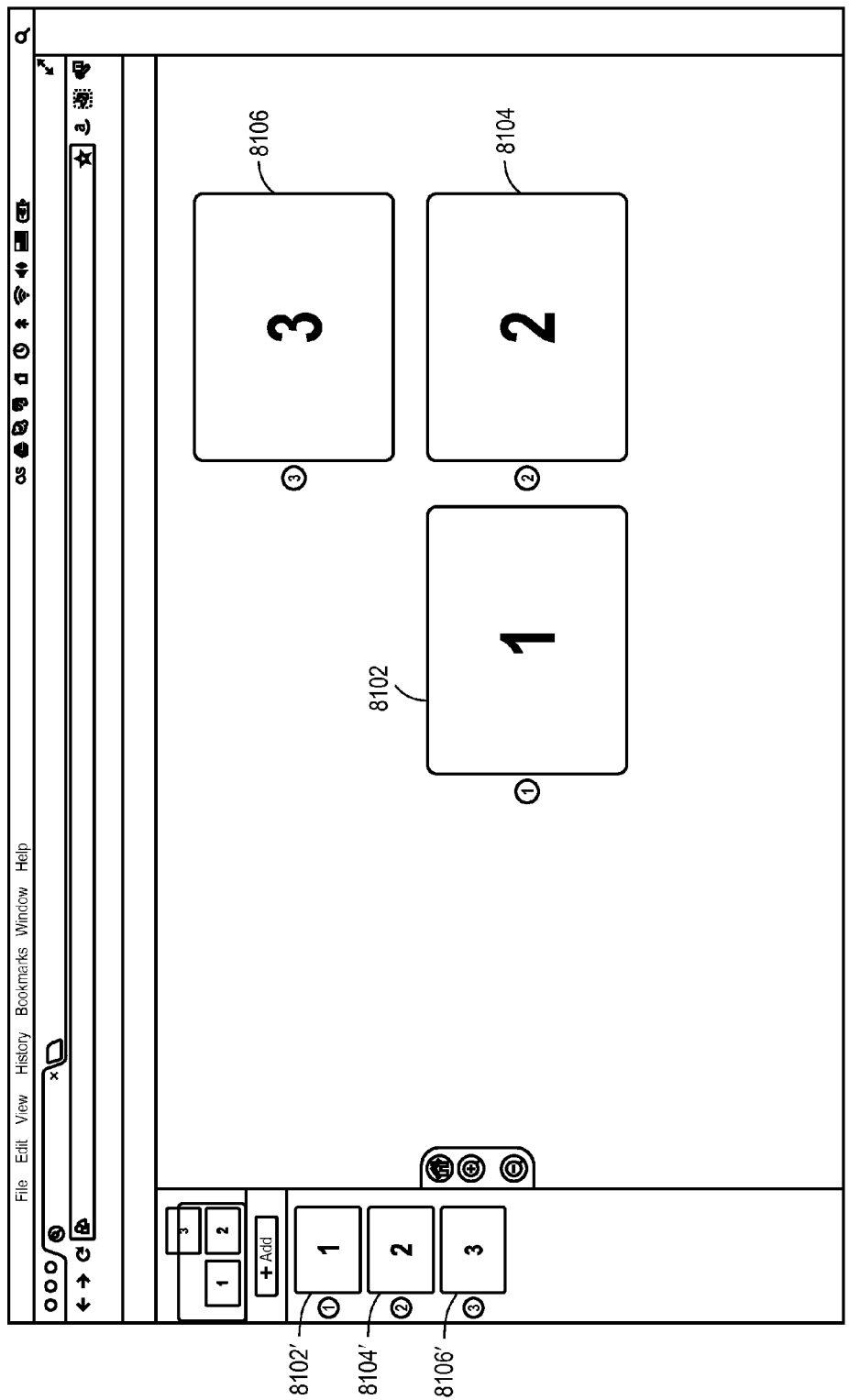
Figure 7D:
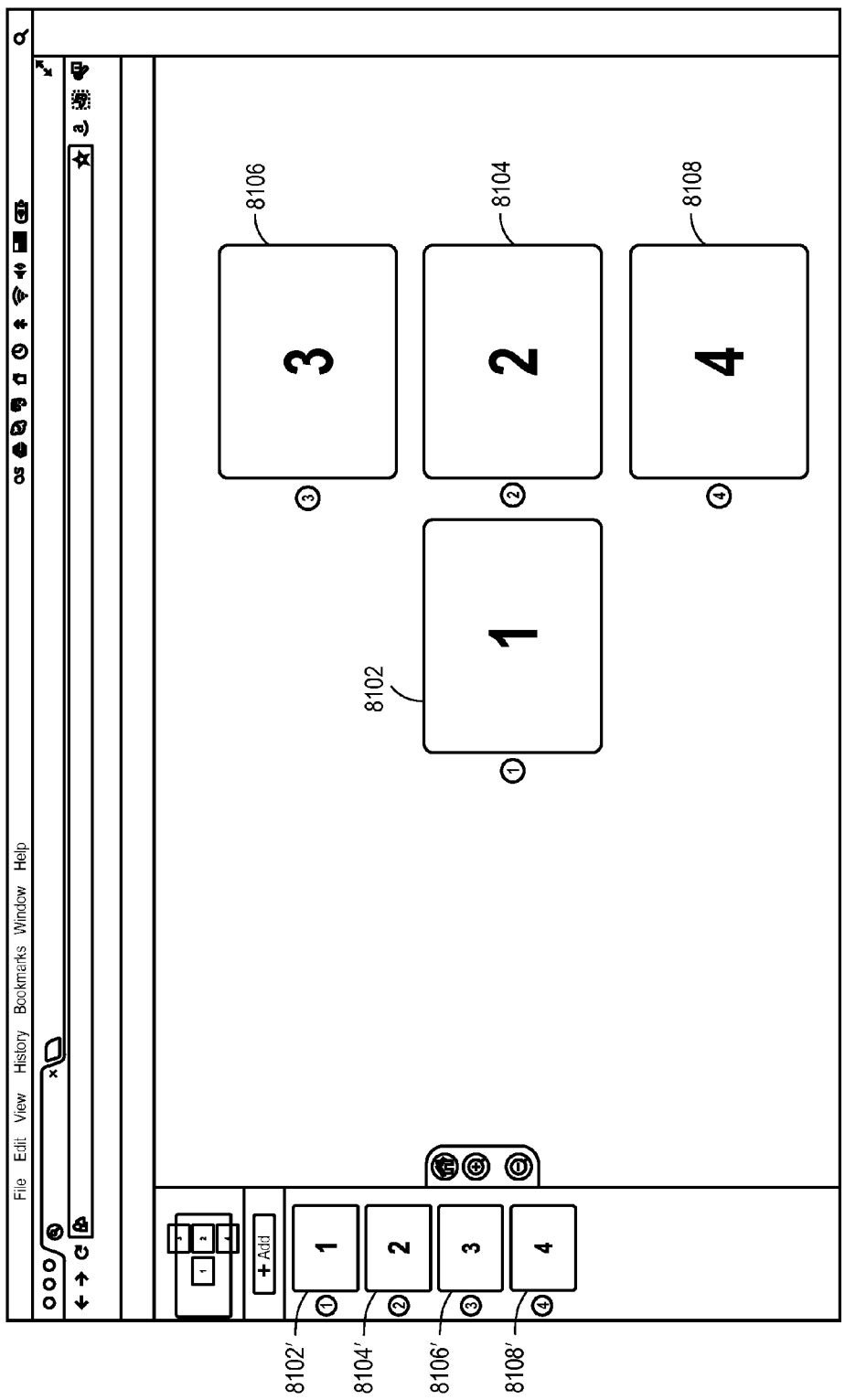
Figure 7E:
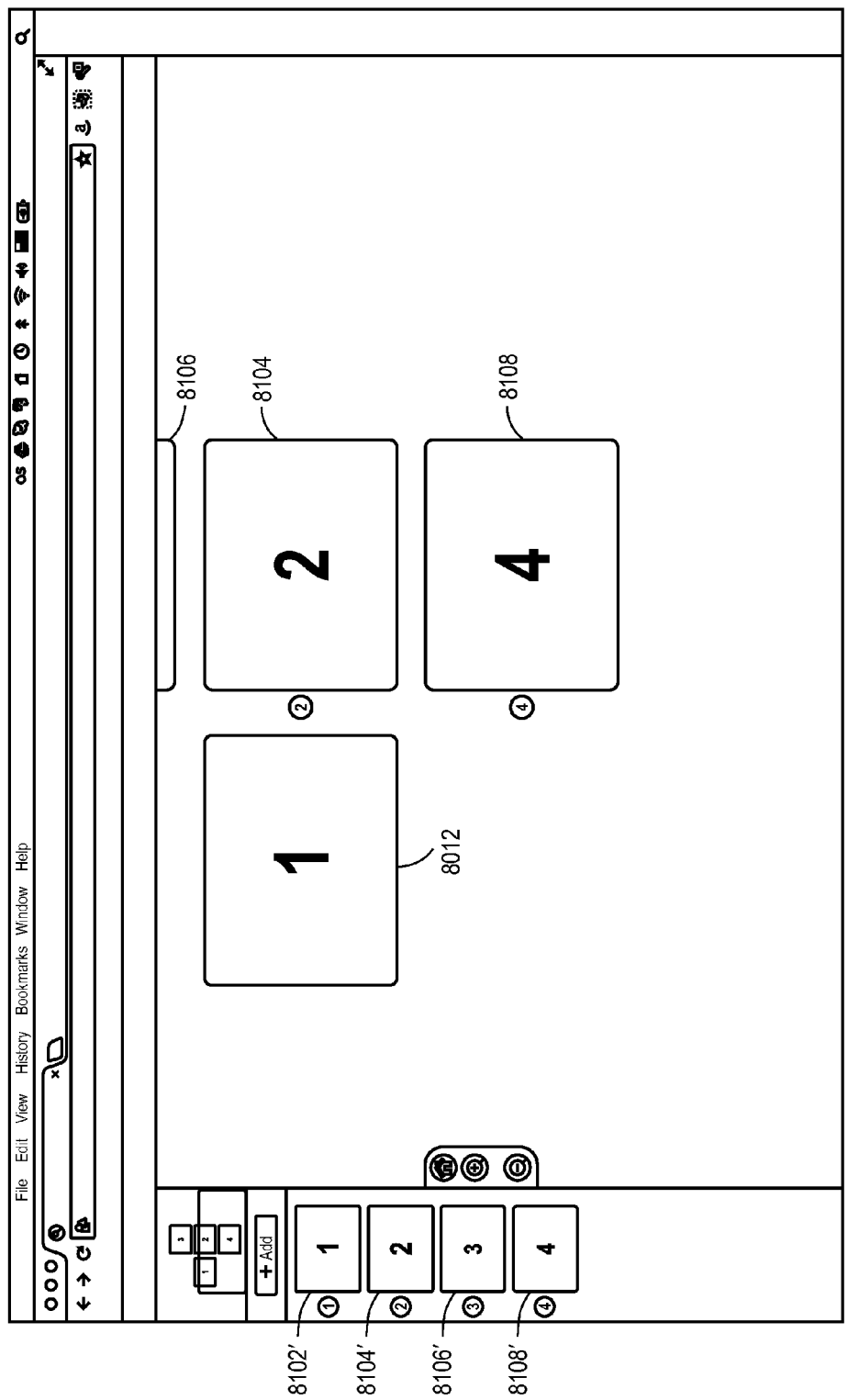
Figure 7F:
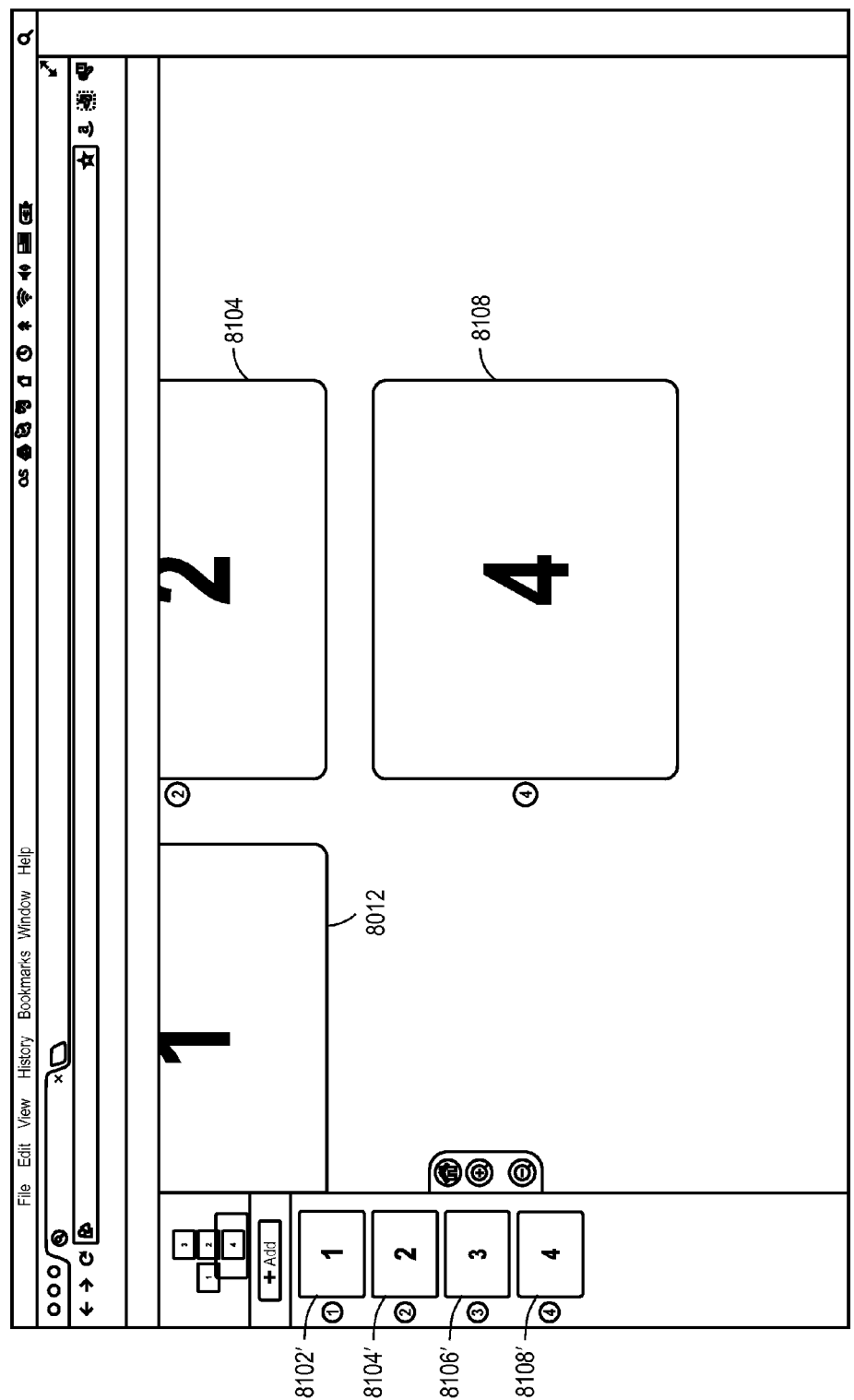
Figure 7G:
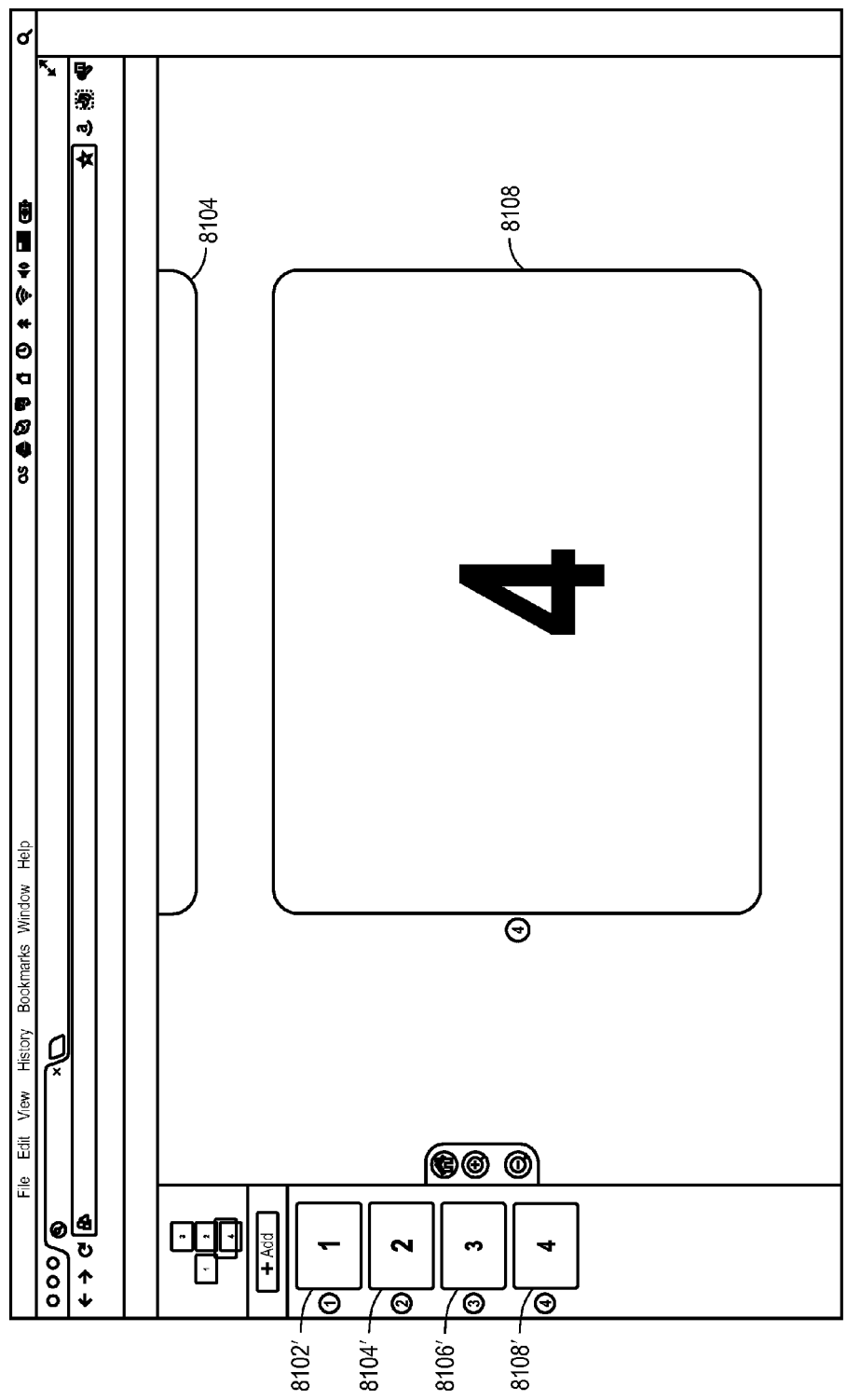
Figure 7H:
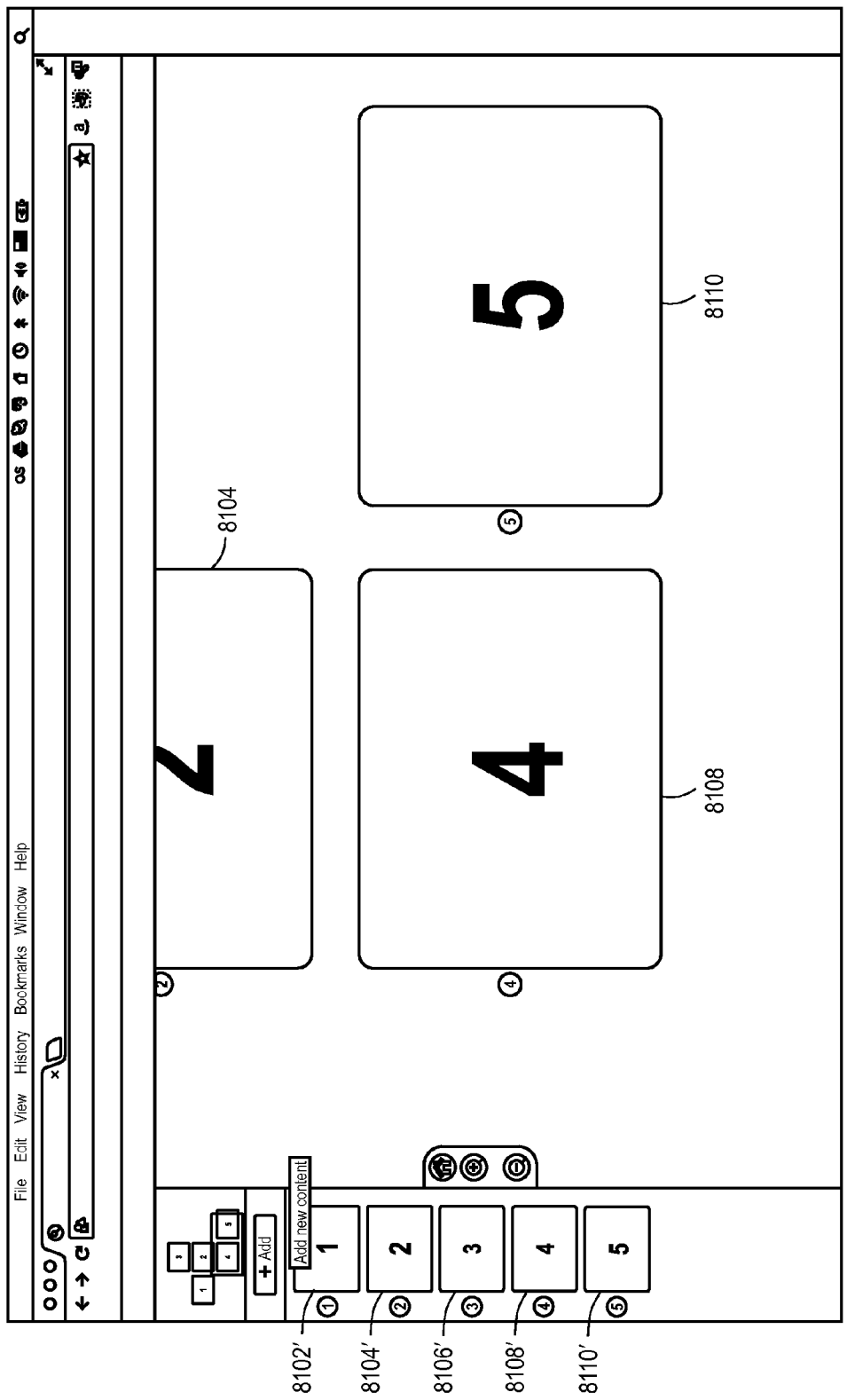
Figure 7I:
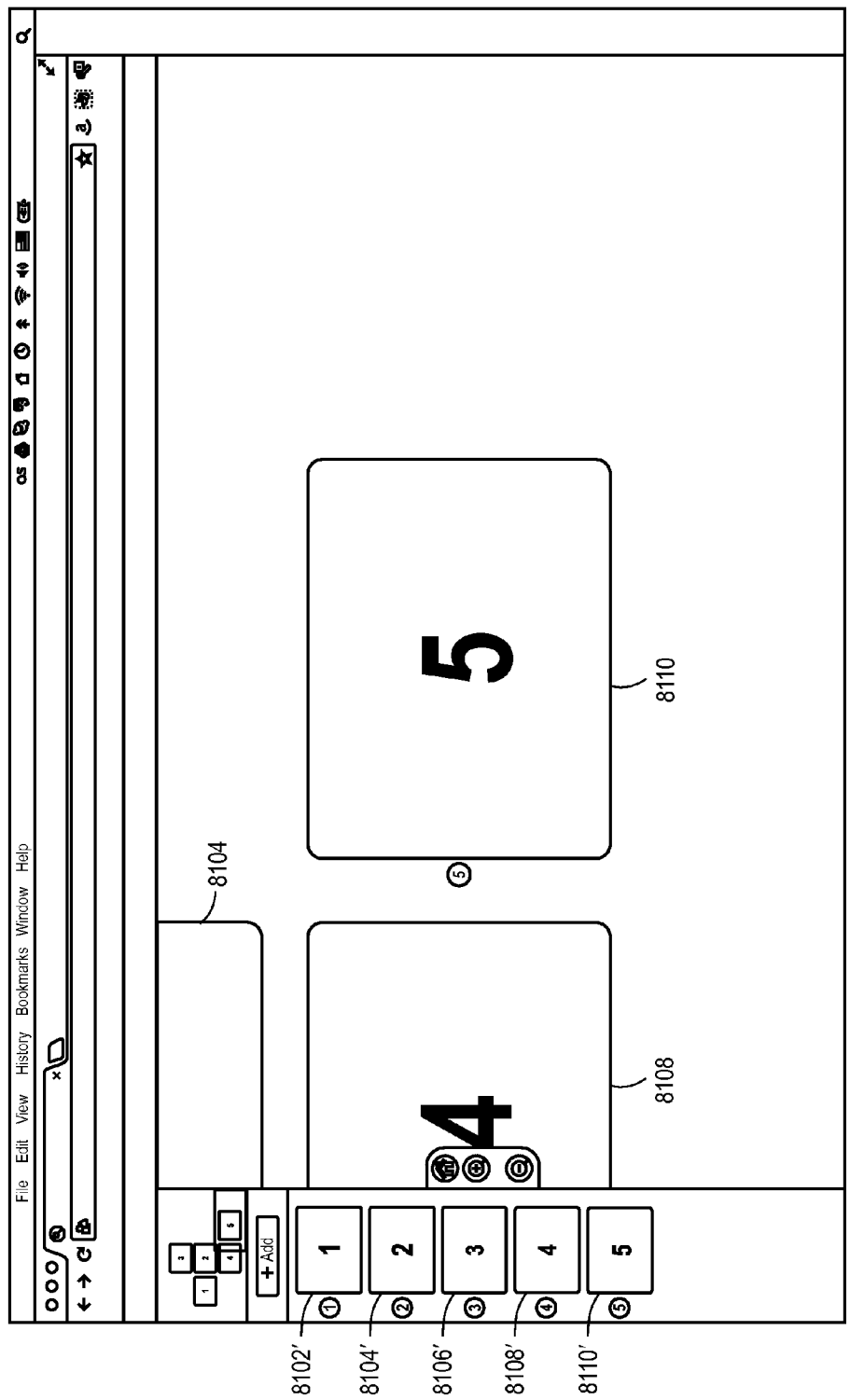
Figure 7J:
Figure 7K:
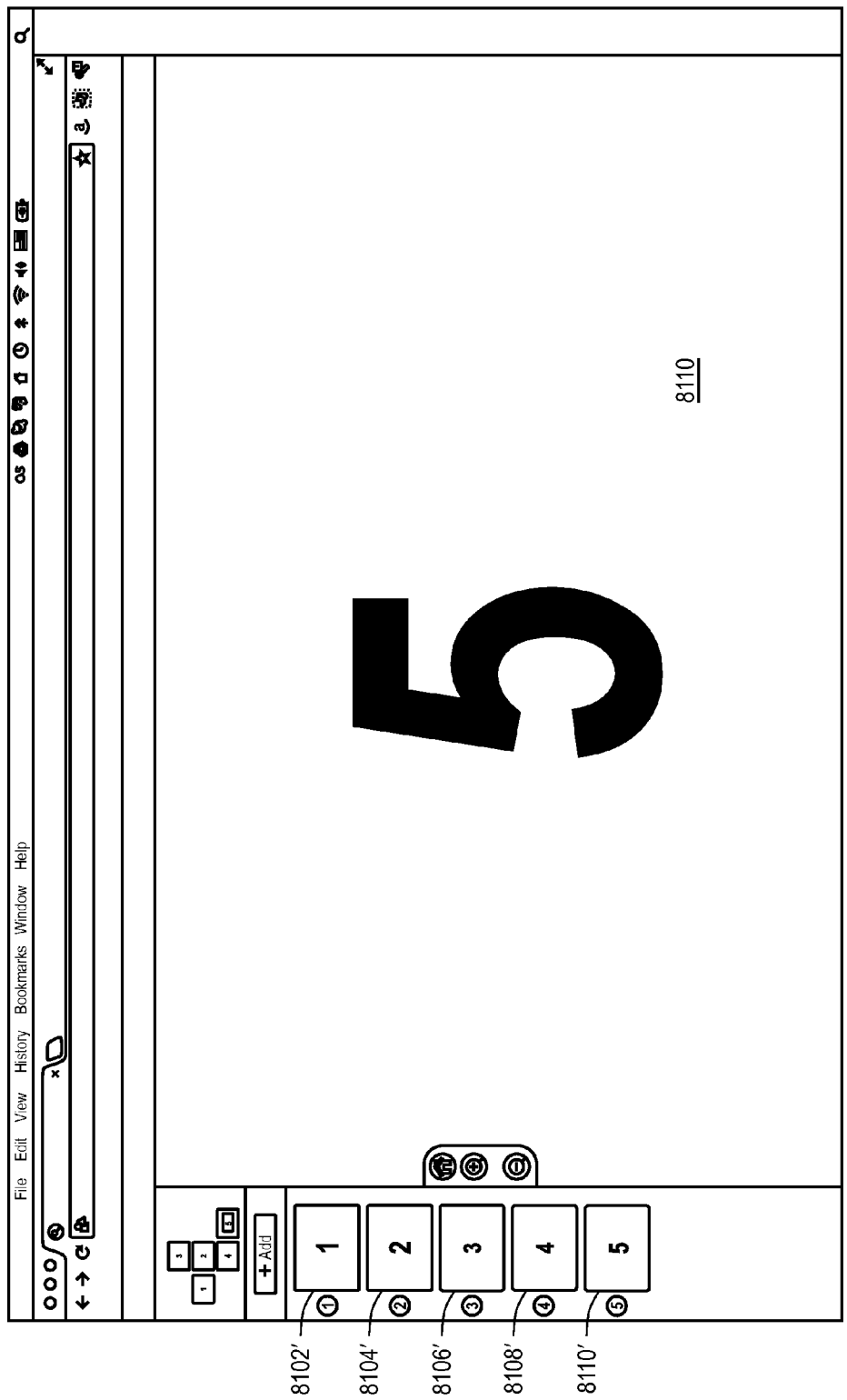
Figure 7L:
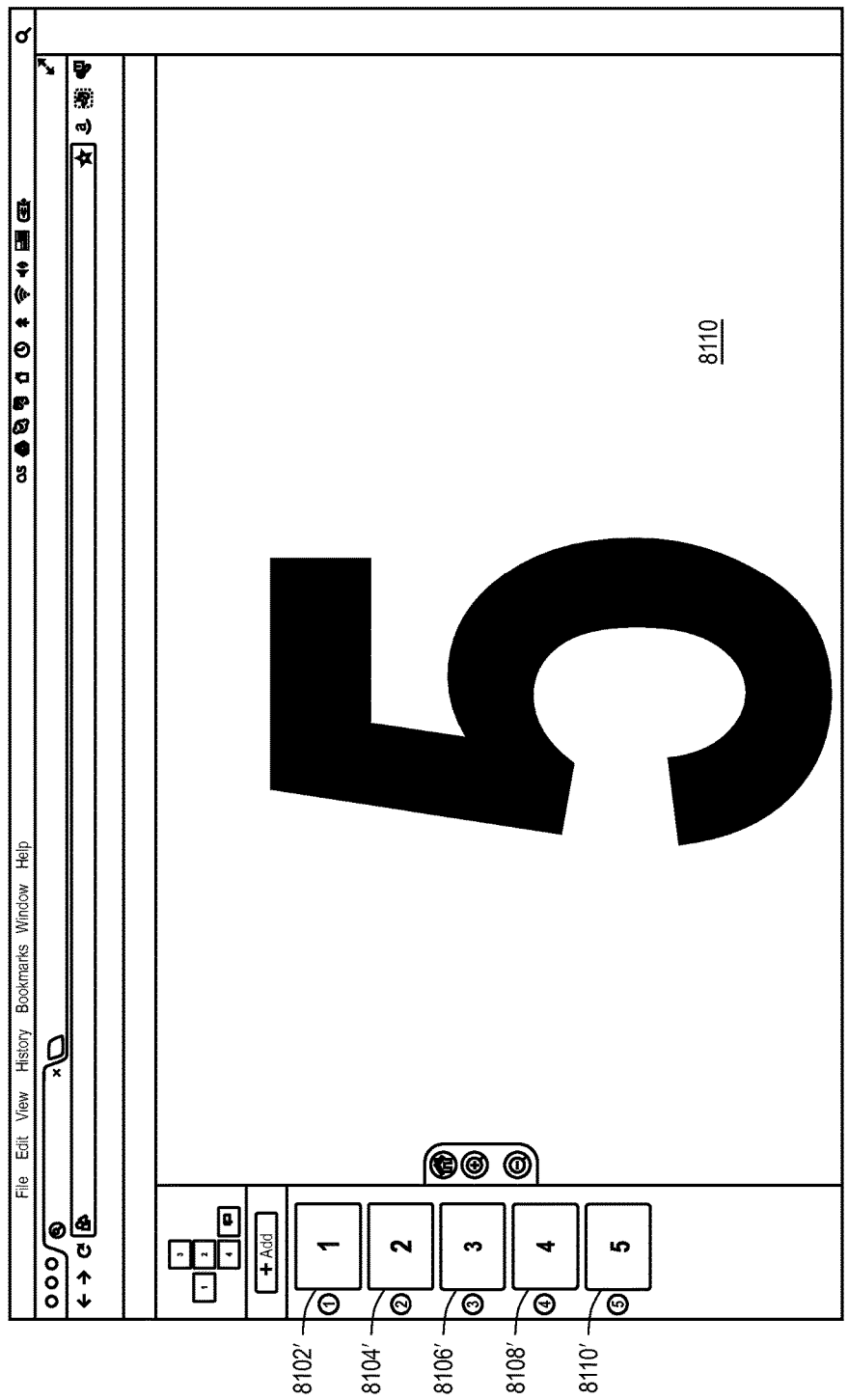
Figure 7M:
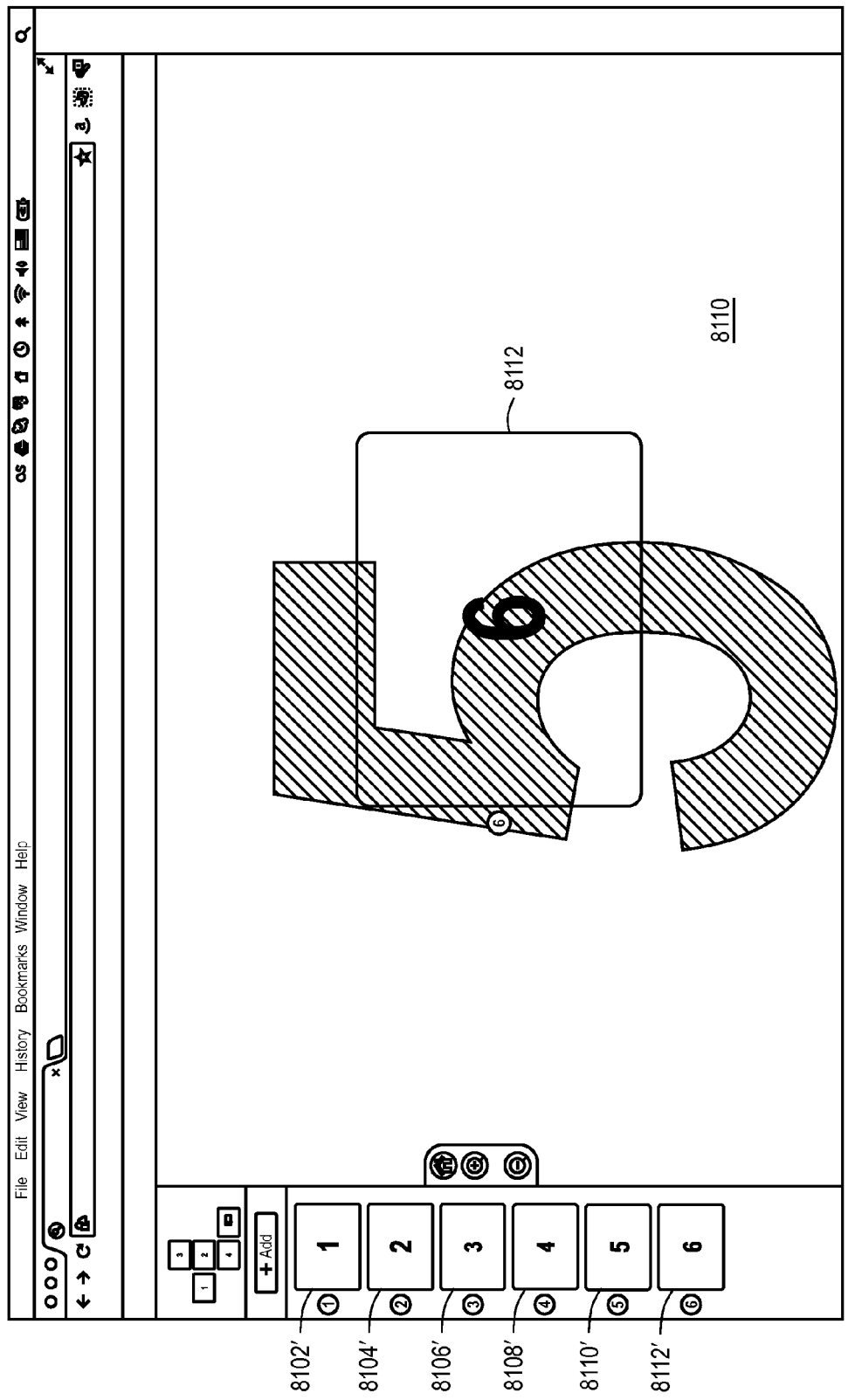
Figure 7N:
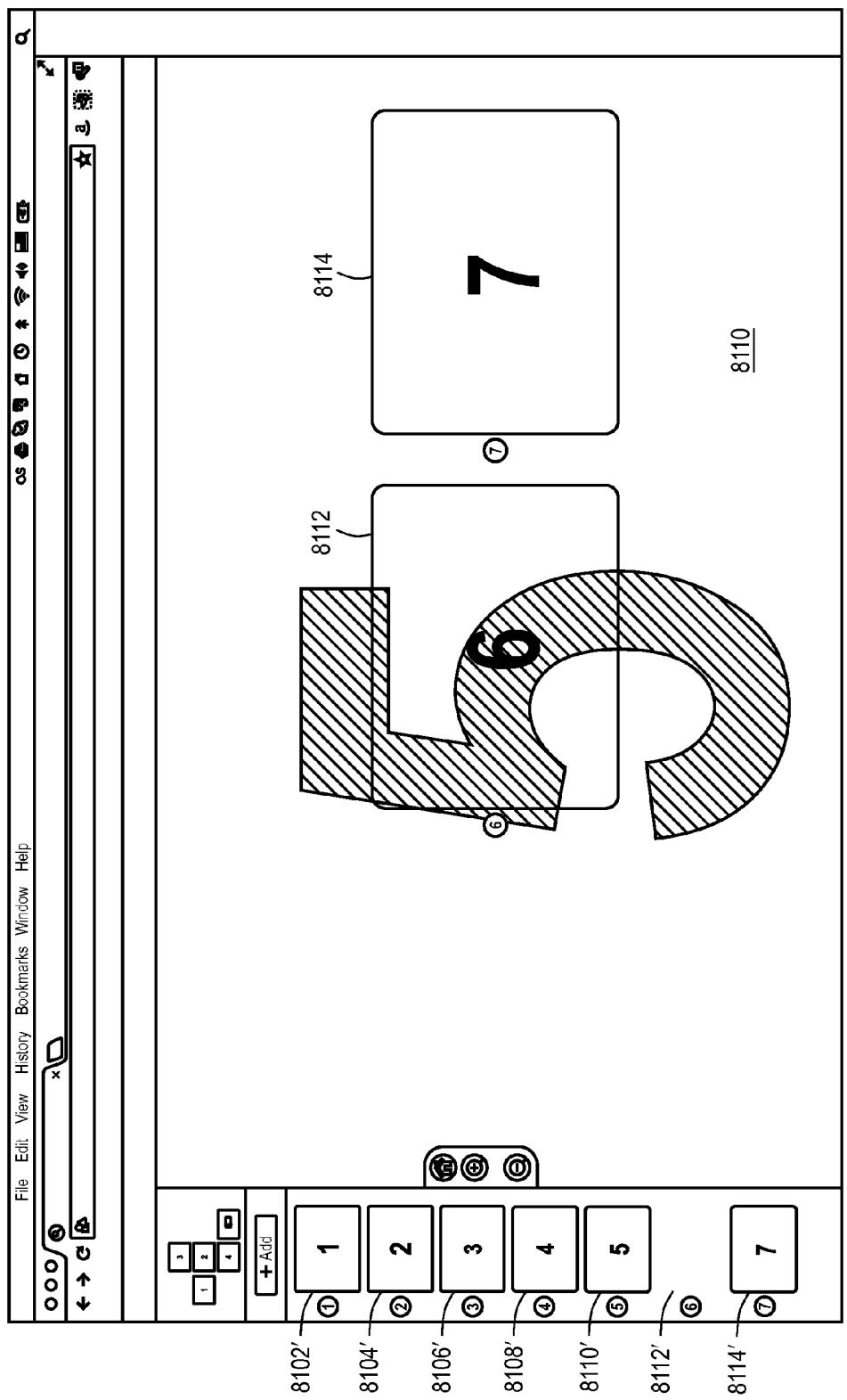

FIGS. 7A-7N are illustrative drawings of a device display screen that show user controlled changes in zoom level in the course of adding slides to a canvas and that show an example of the impact of such zooming level changes in accordance with some embodiments. It will be appreciated that this is an example of adding slides in accordance with an example default placement alternative described above for module 5123 and of modules 5108-5112 of FIG. 4. In this example, in the absence of other specific user input, new slides are placed in the canvas automatically at default locations under control of module 5123 in accordance with an example default rule that requires that a new slide be placed to the immediate right of a slide currently at the center of a portion of the canvas shown on the device screen. The device display screen of FIGS. 7A-7N provides a user interface that includes a control panel region that includes thumbnail images that correspond to screen images and a canvas display region. The control panel region includes a "+Add" button icon that a user selects in order to add a slide to the presentation. In some embodiments, once slides have been placed into presentation order in response to user editing input, thumbnail images in the control panel are ordered vertically in order of the display of corresponding screen images during a presentation. However, initially, in the absence of specific user input, a default ordering of slides (and corresponding screen images) is the order of their creation.

Referring to FIG. 7A, a first thumbnail image 8102' shown in the control panel corresponds to the first slide 8102 shown in the canvas. Referring to FIG. 7B, according to the example default mode of operation of module 5123, assume that a user actuates the add button, and in response, a second thumbnail image 8104' is displayed in the control panel region and a corresponding second slide 8104 is displayed in the canvas to the right of the first slide 8102. In this example, in FIG. 7A and in FIG. 7B, the first slide 8102 is disposed at the center of the portion of the canvas shown on the device screen, and therefore, in accordance with the placement rule, the second slide 8104 is placed to the immediate right of the first slide 8102 in the canvas.

Referring to FIG. 7C, assume that a user again actuates the add button, and in response according to the example default mode of operation of module 5120, a third thumbnail image 8106' is displayed in the control panel region and a corresponding third slide 8106 is displayed in the canvas to the right of the first slide 8102. At the time of the addition of the third slide 8106, just as at the time of the addition of the second slide 8104, the first slide 8102 is disposed at the center of the portion of the canvas shown on the device screen. It will be appreciated that in accordance with some embodiments, a computer device may be configured to implement an example slide location placement rule that seeks to place each new slide as close as possible and to the immediate right of the slide currently at the center of the portion of the canvas displayed on the screen. In some embodiments, later added slides may be added immediately to the right of the center slide above or below previously added slides. According to the example placement rule, the third slide 8106 is placed to the immediate right of the first slide 8102. However, since the second slide 8104 already has been placed immediately adjacent to the first slide 8102, the third slide 8106 is placed immediately above and adjacent to the second slide 8104, and to the immediate right of the first slide 8102.

Referring to FIG. 7D, assume that a user yet again actuates the add button, and in response according to the example default mode of operation of module 5120, a fourth thumbnail image 8108' is displayed in the control panel region and a corresponding fourth slide 8108 is displayed in the canvas to the right of the first slide 8102. At the time of the addition of the fourth slide 8108, just as at the time of the addition of the second and third slides 8104, 8106, the first slide 8102 is disposed at the center of the portion of the canvas shown on the device screen. According to the example placement rule, the fourth slide 8108 is placed to the immediate right of the first slide 8102. However, since the second slide 8104 already has been placed immediately adjacent to the first slide 8102 and the third slide 8106 is placed above the second slide 8104, the fourth slide 8108 is placed immediately below and adjacent to the second slide 8104, and to the immediate right of the first slide 8102.

Referring to FIGS. 7E-7G, illustrates the example screen image as a user scrolls a viewing window for the canvas downward and to the right so that the fourth slide is centered in the portion of the canvas shown on the device screen and also zooms in on the fourth slide 8108. In FIG. 7E, assume that a user has scrolled downward so that the fourth screen is offset slightly to the right of center in the portion of the canvas shown on the device screen.

In FIG. 7F, assume that the user has scrolled to the slightly to the right so that the fourth slide 8104 is centered in the portion of the canvas shown on the device screen and has zoomed in on the canvas to a more zoomed-in level. In FIG. 7G, assume that the user has zoomed-in on the canvas to an even higher zooming level than in FIG. 7F.

Referring to FIG. 7H, assume that a user again actuates the add button, and in response, a fifth thumbnail image 8110' is displayed in the control panel region and a corresponding fifth slide 8110 is displayed in the canvas to the right of the fourth slide 8108. At the time of the addition of the fifth slide 8110, the fourth slide 8108 is disposed at the center of the portion of the canvas shown on the device screen. Thus, according to the example default placement rule, the fifth slide 8110 is placed to the immediate right of the fourth slide 8108. Moreover, the fifth slide 8110 is added with the same zoom level as the fourth slide 8108.

It will be noted that as shown in FIG. 7G, the canvas region is more zoomed-in at the moment when the fifth slide 8110 was added than it was when the fourth slide 8108 was as indicated in FIG. 7C. Assume that decision module 5110 determines that the change in zoom-in level does not meet a prescribed threshold, and as a result, the current reference zoom level does not change. As indicated by the partial view the second slide 8104 together with the view of the fourth and fifth slides 8108, 8110 in FIG. 7H, all of the slides added to that point, i.e. the first through fifth slides, have the same zoom level.

Referring to FIG. 7I, assume that the user scrolls the canvas region so that the fifth slide 8110 is located at the center of the portion of the canvas displayed on the screen. Referring to FIGS. 7J-7L, assume that the user next zooms-in closer and closer to the canvas. In FIG. 7K, a higher zoom-in level results in slide 8110 encompassing the entire viewing window. In FIG. 7L, a still higher zoom-in level results in slide 8110 encompassing the entire viewing window while the viewing window encompasses less than the entire slide 8110. In accordance with some embodiments, a default placement rule of module 5123 holds that a new slide can be added on top of the previous slide, such as slide 8110 in FIG. 7K that takes up an entire reference viewing window. Also, in accordance with some embodiments, a default placement rule of module 5123 holds that a new slide can be added on top of the previous slide, such as slide 8110 in FIG. 7L that takes up an entire reference viewing window where the reference viewing window encompasses less than the entire reference viewing window.

Referring to FIG. 7M, assume that a user again actuates the add button, and in response, a sixth thumbnail image 8112' is displayed in the control panel region and a corresponding sixth slide 8112 is displayed within the canvas. Assume that decision module 5110 determines that the change in zoom-in level does meet a prescribed threshold, and as a result, the current reference zoom level does change to that of the current viewing window. Thus, module 5123 adds new slide, the sixth slide 8112, at a center of the portion of the canvas displayed on the screen, which is within the fifth slide 8110. It is assumed that the change in zoom levels between FIG. 7I and FIG. 7M is greater than the prescribed change described with reference to module 5110 in which the new zoom level is used for the newly added slide.

It will be appreciated that in accordance with some embodiments, this change in reference viewing window also results in removal of the fifth slide 8110 from consideration. As a result, the sixth slide 8112 is added within the fifth slide 8110 rather than being placed outside of the fifth slide 8110.

Referring to FIG. 7N, assume that a user again actuates the add button, and in response, a seventh thumbnail image 8114' is displayed in the control panel region and a corresponding seventh slide 8114 is displayed in the canvas to the right of the sixth slide 8112. At the time of the addition of the seventh slide 8114, the sixth slide 8112 is disposed at the center of the portion of the viewing window. There is no difference in zoom levels between the time when the sixth slide 8112 is added and the time when the seventh slide 8114 is added. Thus, according to the example default mode of operation of module 5123, the seventh slide is placed to the immediate right of the sixth slide 8112. Both the sixth and seventh slides 8112, 8114 are disposed within the fifth slide 8110.

Example—Blocking Display Elements and Slide Placement

FIGS. 8A-8J are illustrative drawings of a device display screen showing searching for alternate placement locations for slides in response to display elements blocking a placement location in accordance with some embodiments. It will be appreciated that this is an example of adding slides in accordance with an example default placement alternative described above for module 5123 of FIG. 4. In this example, in the absence of other specific user input and in the absence of a discerned pattern, a new slide is placed in the canvas automatically at default locations under control of module 5123, which applies default placement rules in accordance with an example rule.

The display elements that block new slide placement can be text, images or other objects contained within the canvas, for example. In accordance with an example default placement rule, a newly added slide cannot be placed over a display element previously placed within the canvas. In this illustrative example the default placement rules, generally speaking, involve placement according to a priority rule in which horizontal displacement to the right in the canvas is preferred followed by vertical displacement in an upward direction in the canvas followed by vertical displacement in a downward direction in the canvas followed by horizontal displacement to the left in the canvas. The illustrative example default rules also require that no slides should be placed to the left of the first slide to be placed. A further requirement of the example rules is to maximize the packing density, i.e. closeness together, of slides within the when display objects block placement of slides. Details of example default rules are unimportant to the invention, however.

Figure 8A:
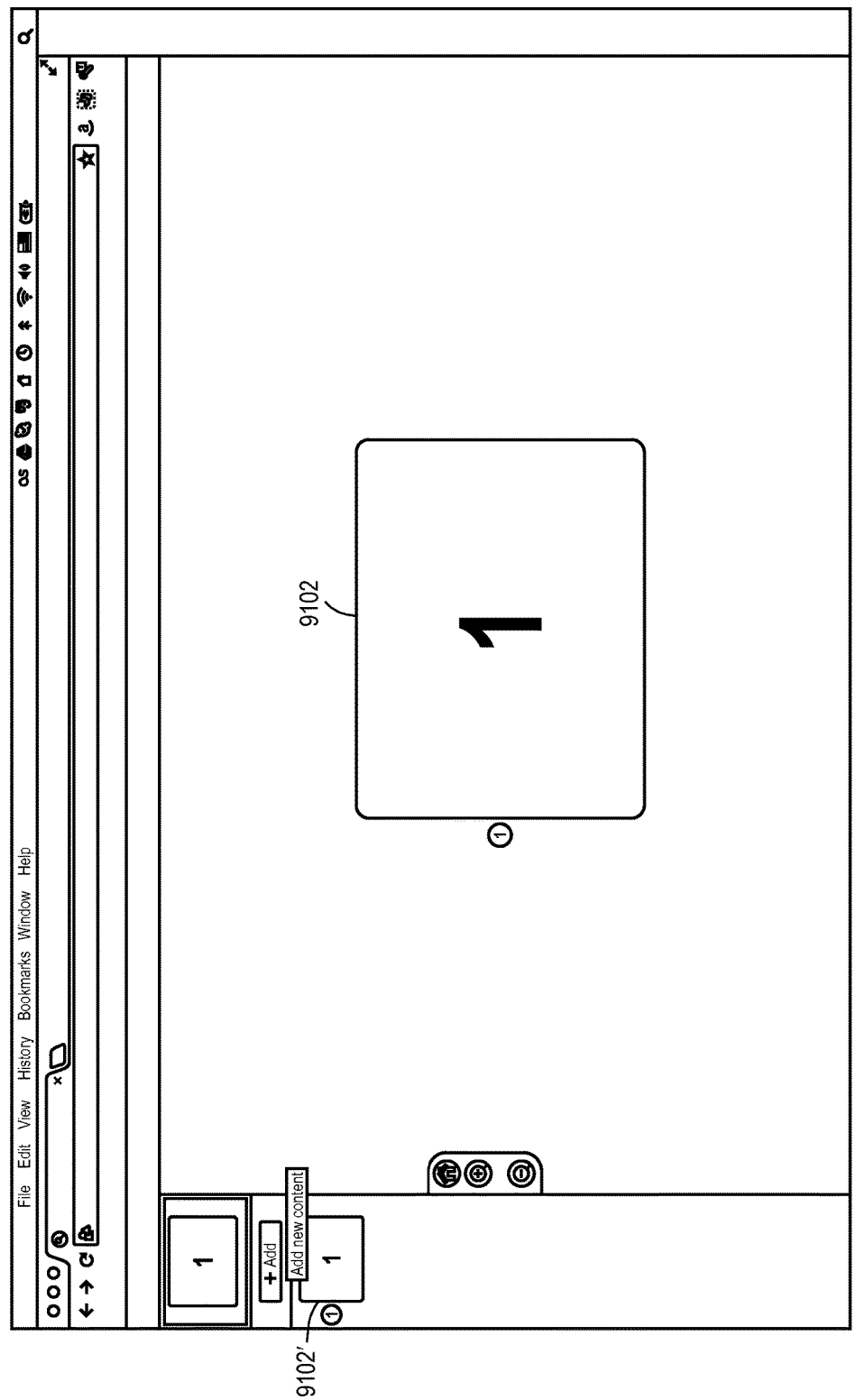
FIGS. 8A-8J are illustrative drawings of a display screen showing searching for alternate placement locations for slides in response to display elements blocking a placement location in accordance with some embodiments.
Figure 8B:
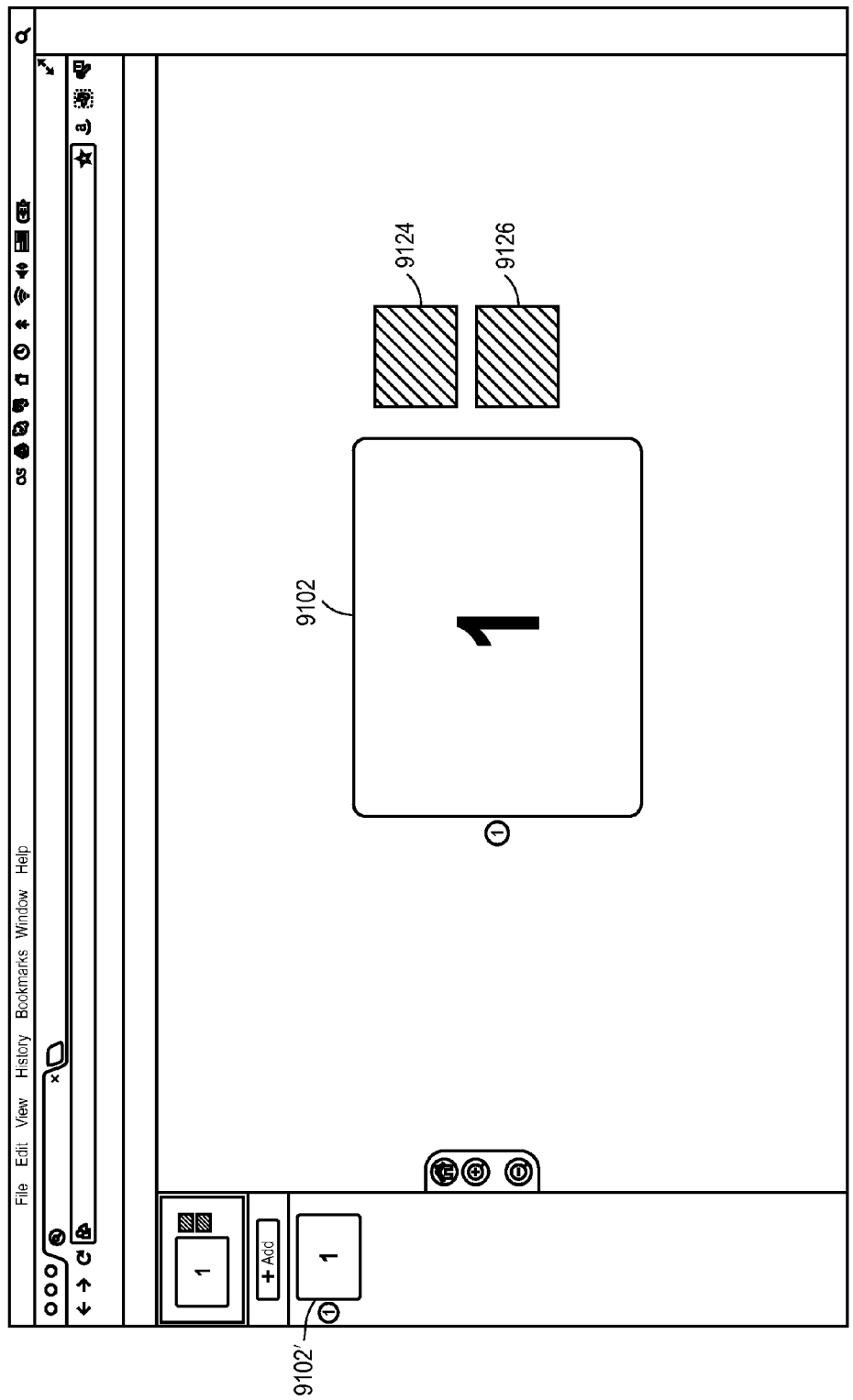
Figure 8C:
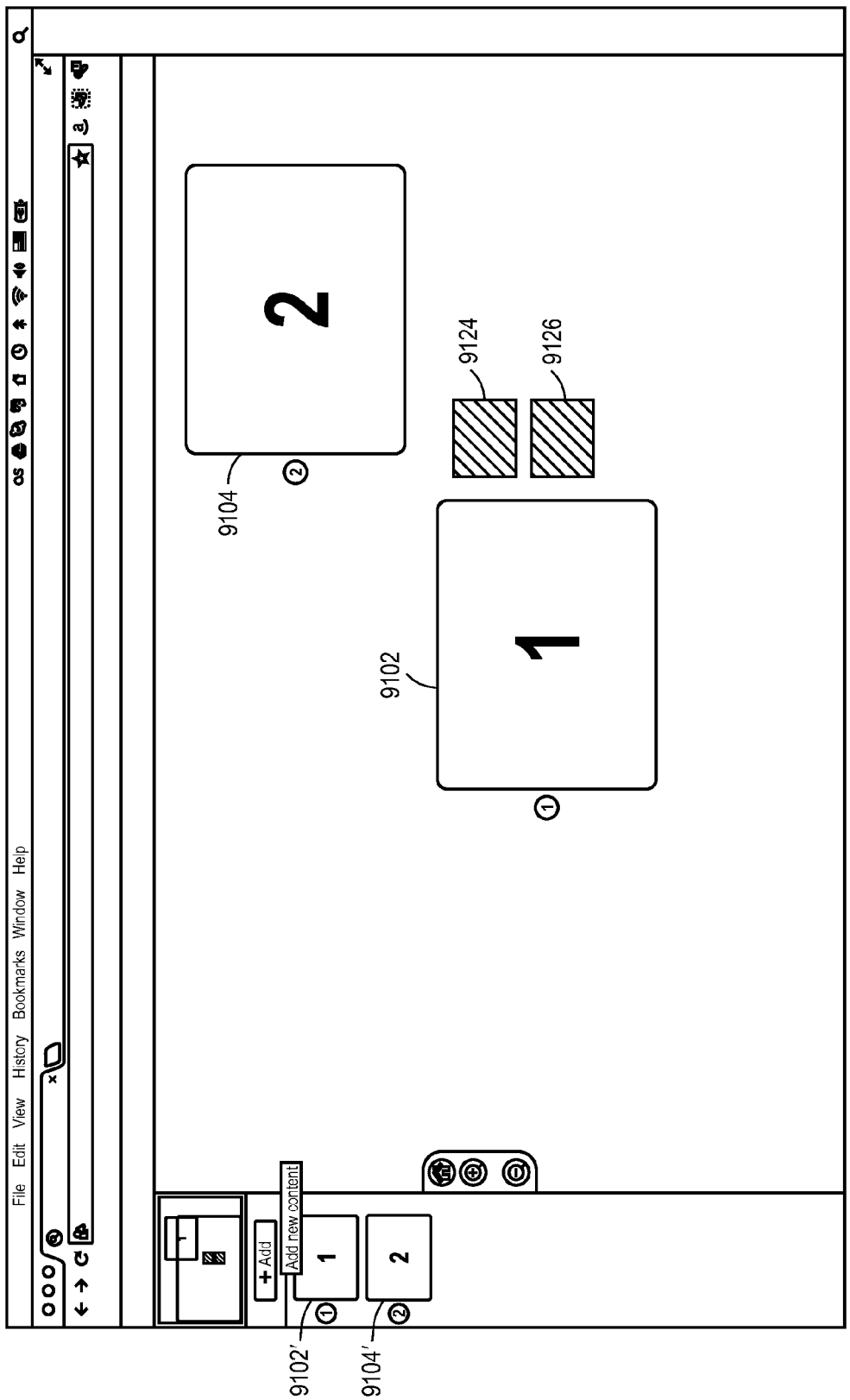
Figure 8D:
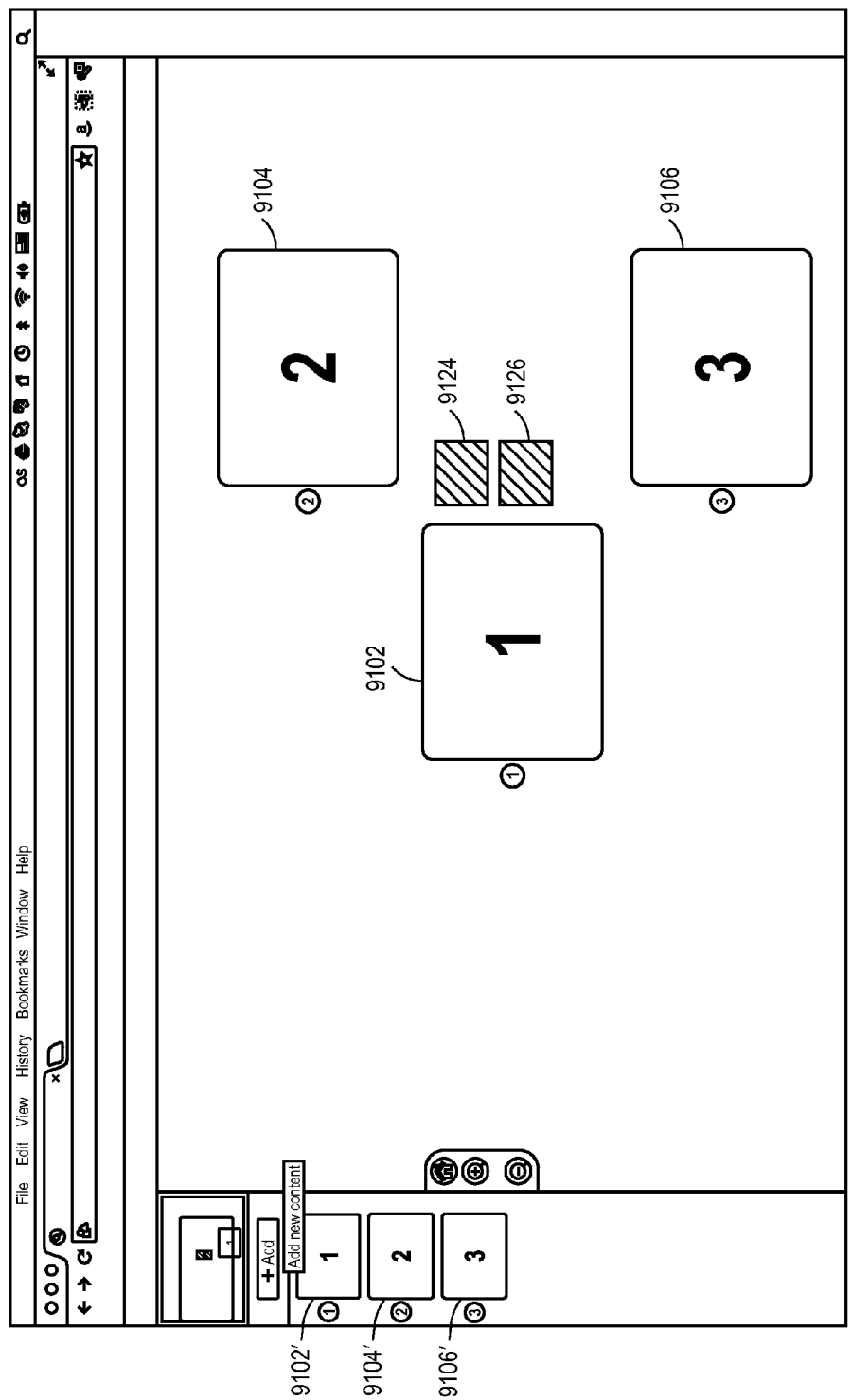

Referring to FIG. 8A, assume that a user actuates the add button, and in response, a first thumbnail image 9102' is displayed in the control panel region and a corresponding first slide 9102 is displayed in the canvas. Referring to FIG. 8B, assume that following the addition of the first slide 9102 but before the addition of the next slide, two square display elements 9124, 9126 are added, by a user during editing, to the immediate right of the first slide 9102 as shown. Referring to FIG. 8C, assume that a user again actuates the add button, and in response, a second thumbnail image 9104' is displayed in the control panel region and a corresponding second slide 9104 is displayed in the canvas. Since the display elements are disposed in the canvas to the immediate right of the first slide, modules 5122-5124 cause the second slide 9104 to be added to the right and above the first slide 9102 within the canvas. Referring to FIG. 8C, assume that a user again actuates the add button, and in response, a third thumbnail image 9106' is displayed in the control panel region and a corresponding third slide 9106 is displayed in the canvas. Since the two square display elements 9104, 9106 are disposed in the canvas immediately below the second slide 9104, modules 5122-5124 cause the third slide 9106 to be added to the right and below the first slide 9102 within the canvas.

Figure 8E:
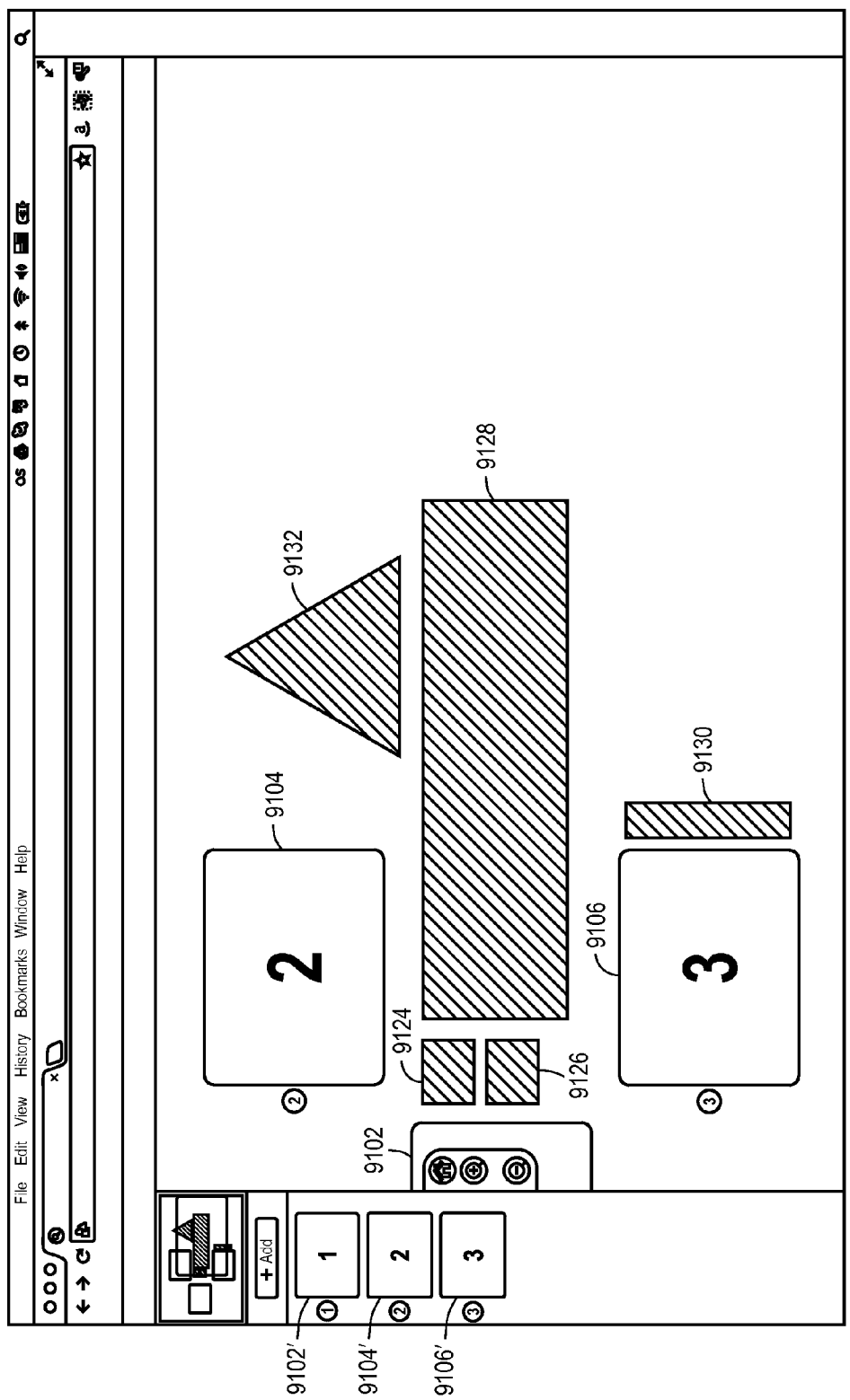
Figure 8F:
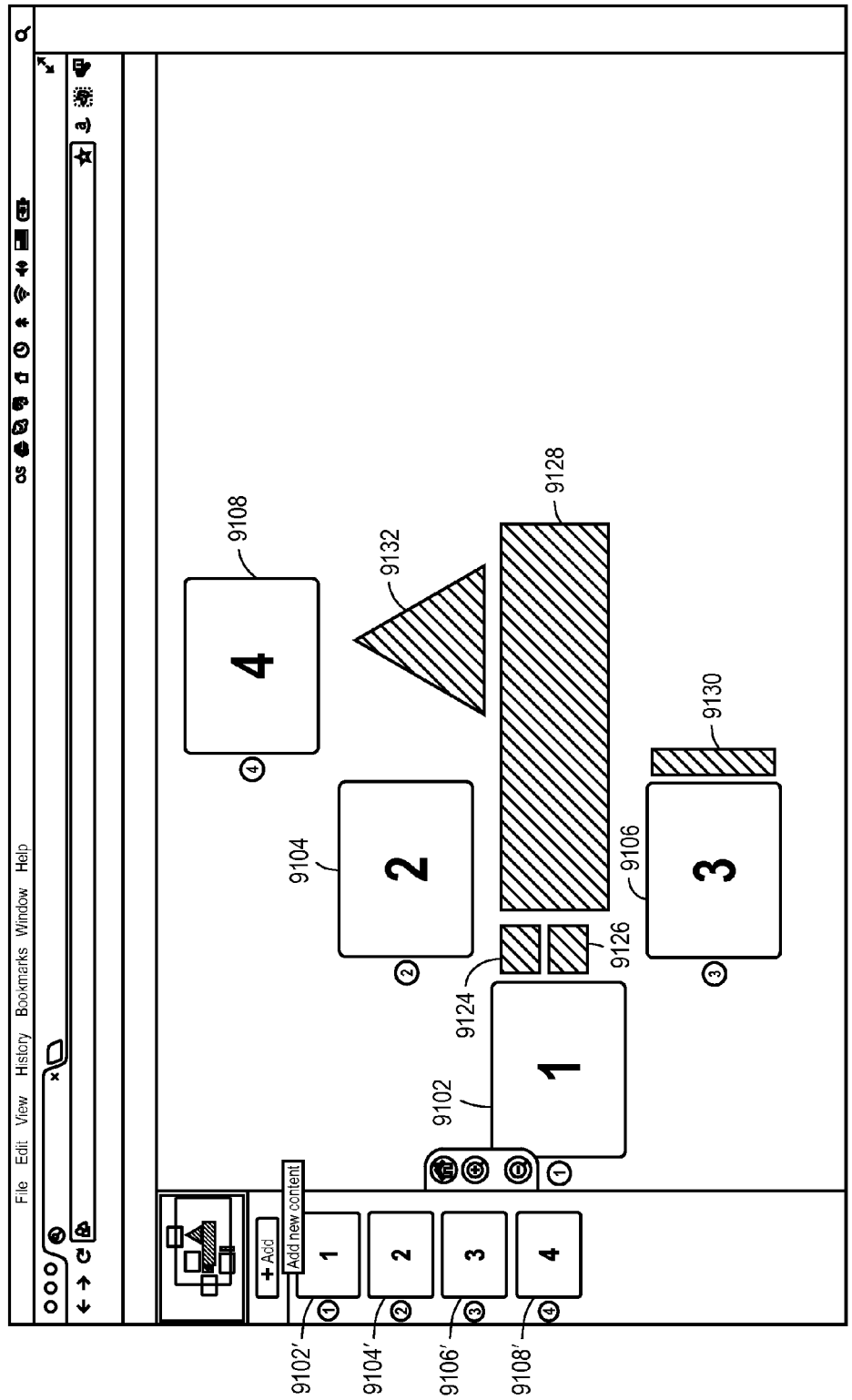

Referring to FIG. 8E, assume that following the addition of the third slide 9106 but before the addition of the next slide, another larger rectangular display element 9128 is added to the right of the two square display element 9124, 9126, another rectangular display element 9130 is added to the right of the third slide 9106 and a triangular display element 9132 is added to the right of the second slide 9104. Referring to FIG. 8F, assume that a user again actuates the add button, and in response, a fourth thumbnail image 9108' is displayed in the control panel region and a corresponding fourth slide 9108 is displayed within the canvas. Since the newly added display elements 9128, 9130 block the area of the canvas to the immediate right of the third slide 9106, modules 5122-5124 cause the fourth slide 9108 to be placed within the canvas in the first open position to the right and above the third slide 9106 in the canvas.

Figure 8G:
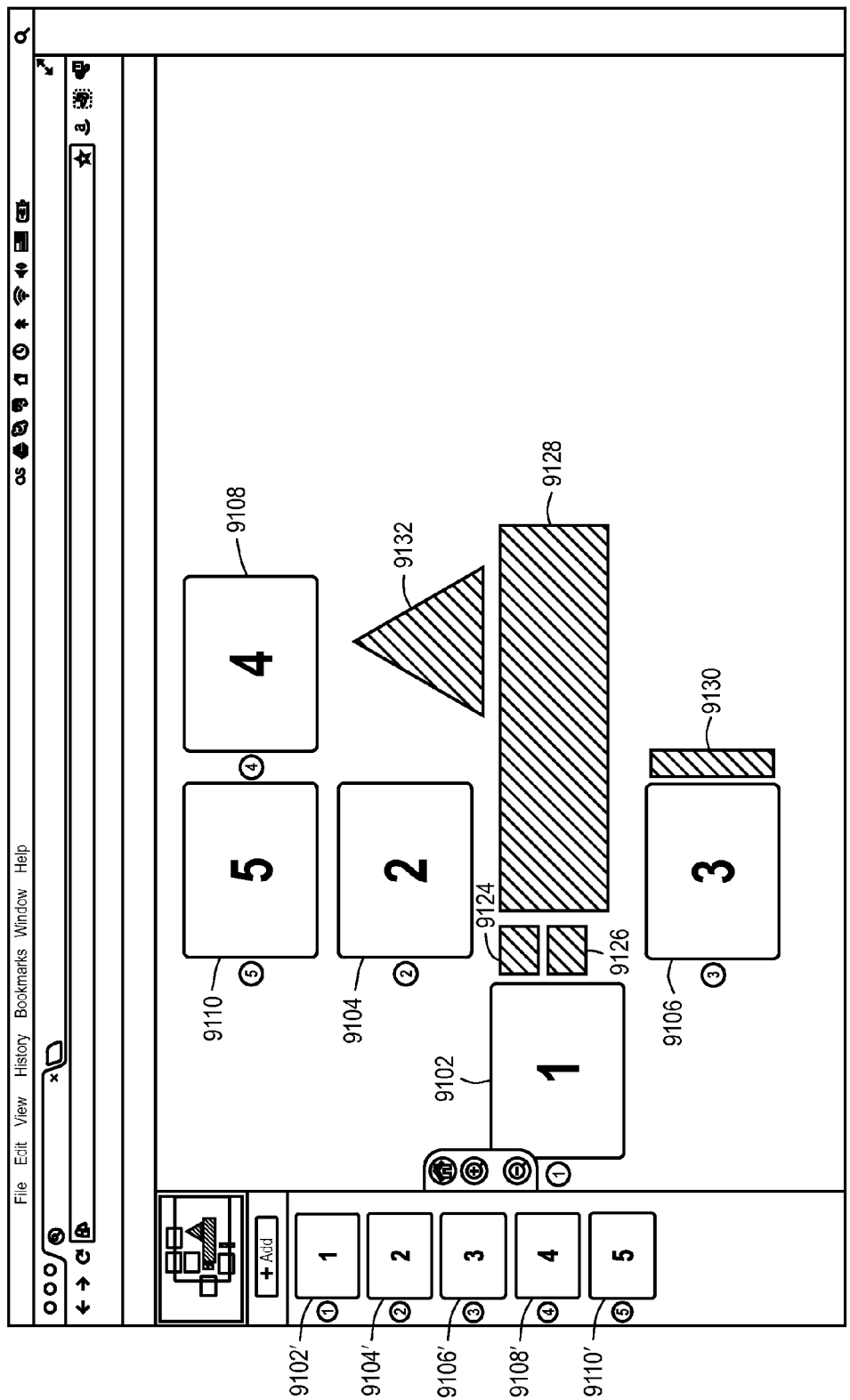
Figure 8H:
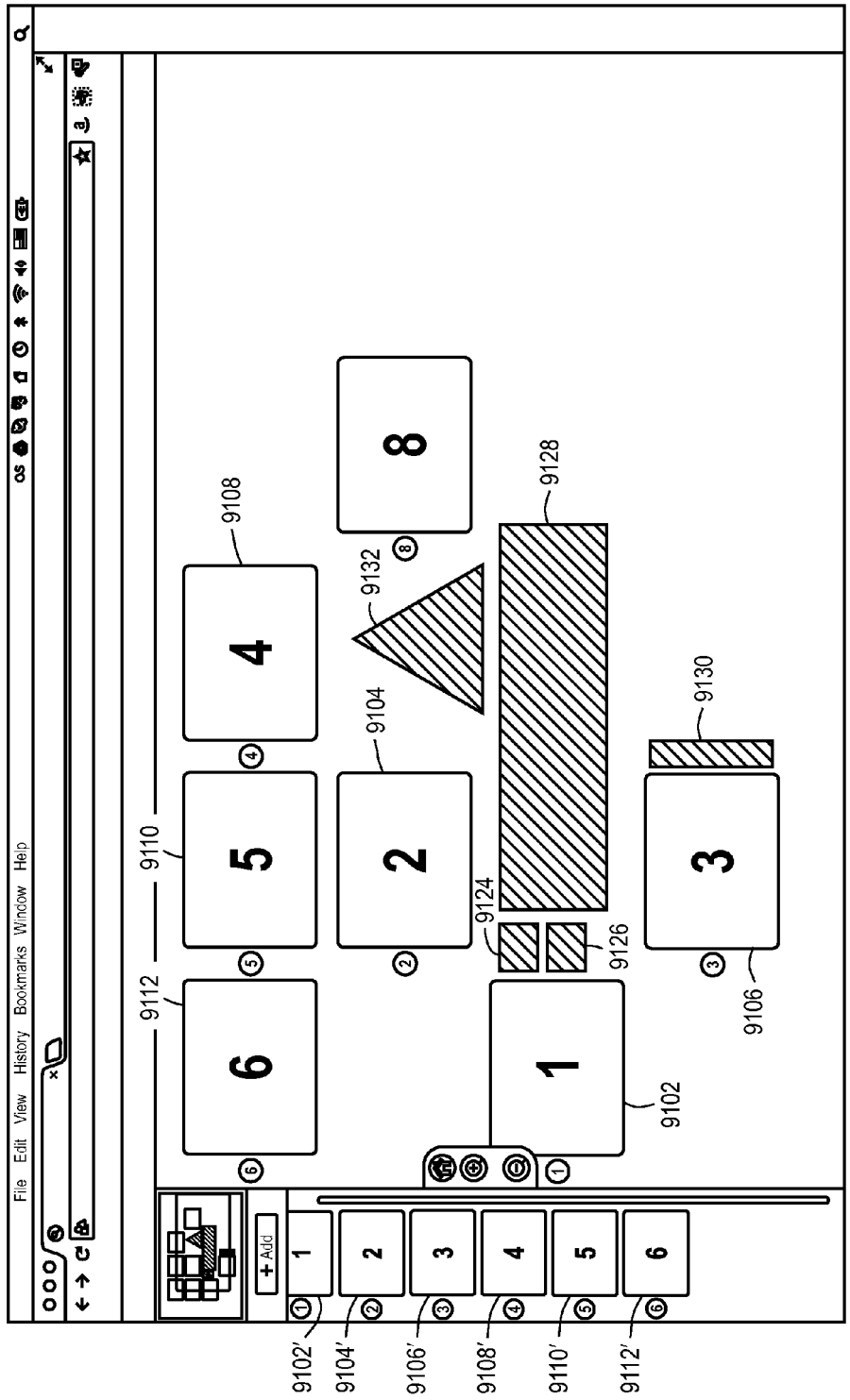
Figure 8I:
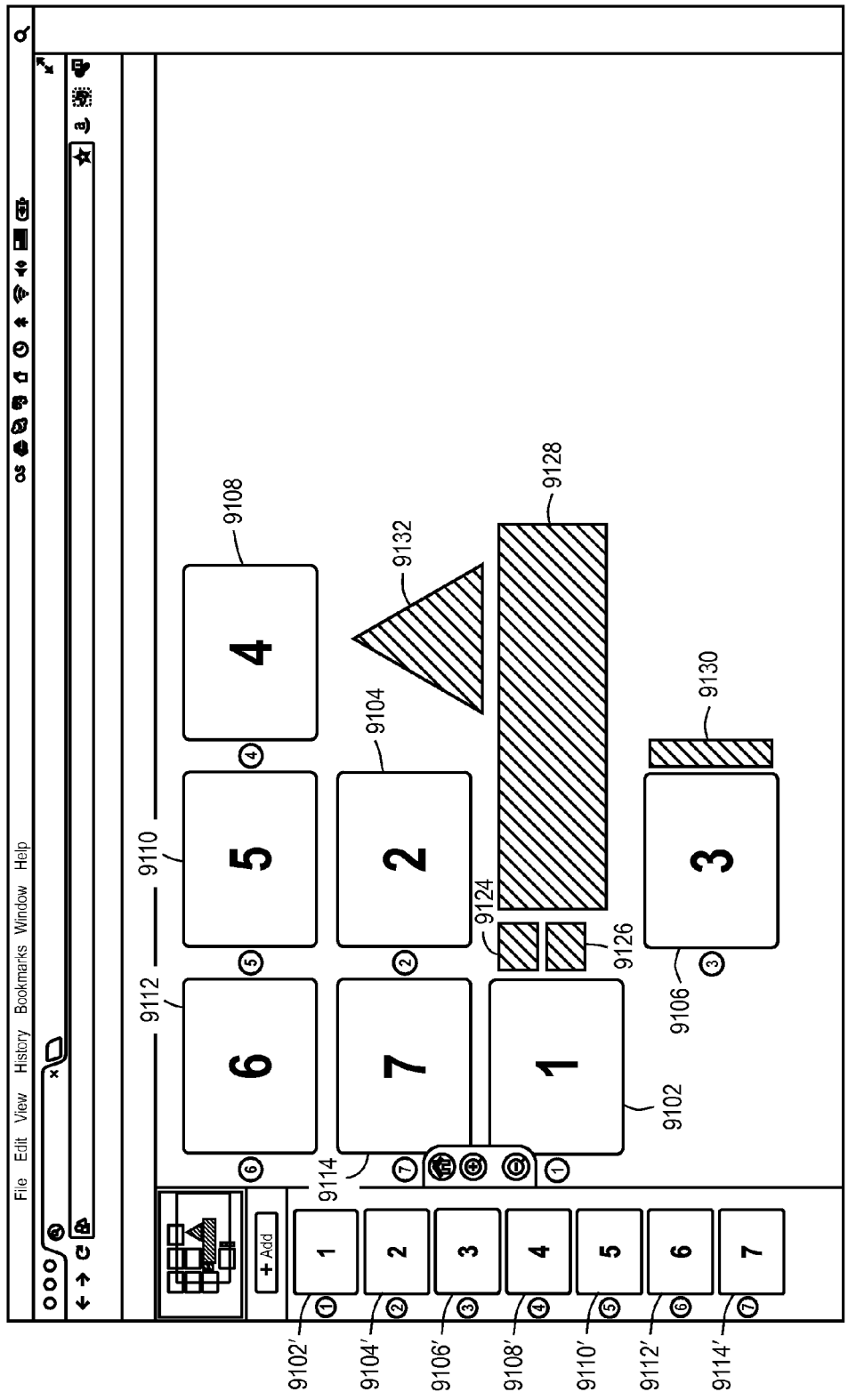
Figure 8J:
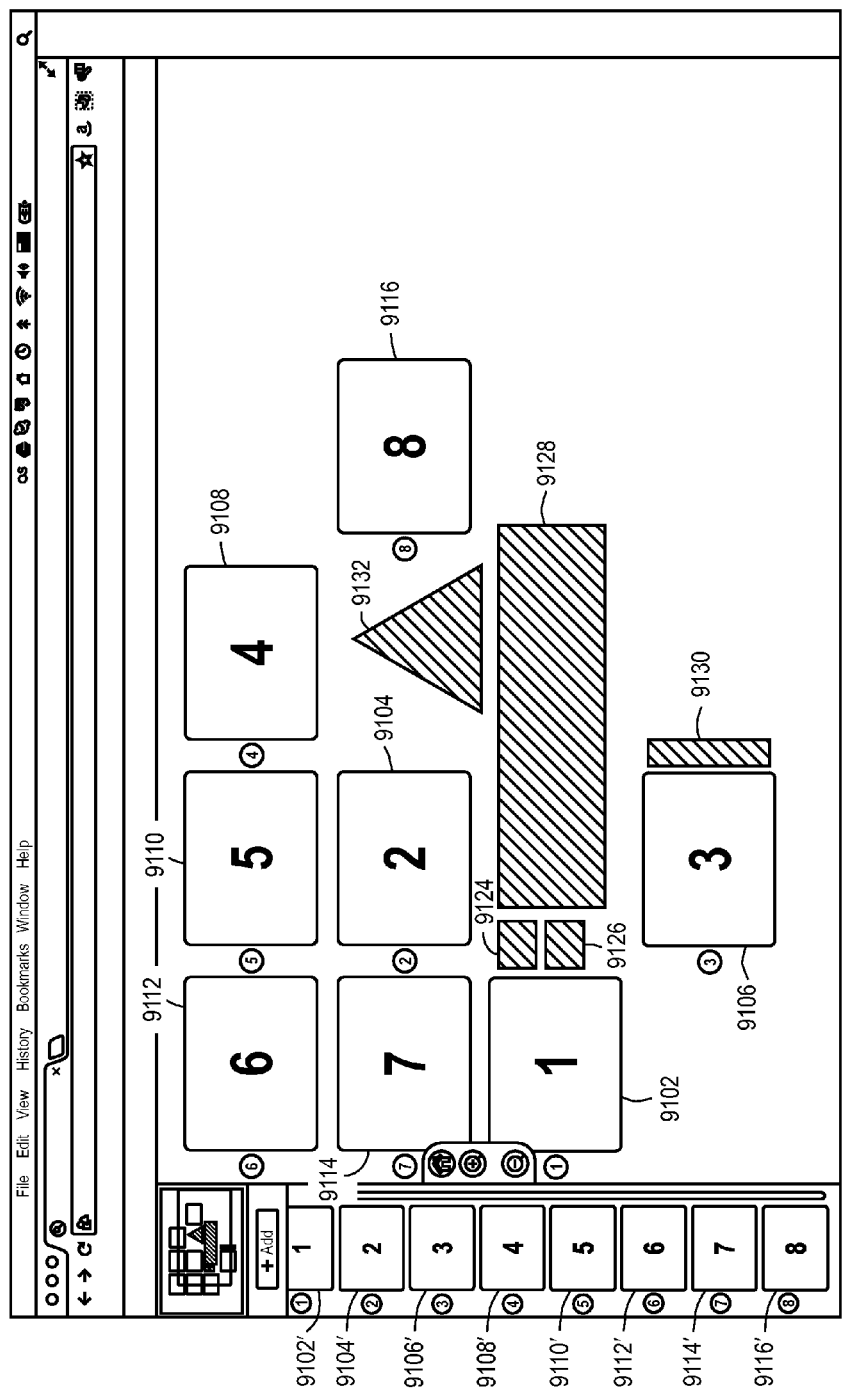

Referring to FIG. 8G, assume that a user again actuates the add button, and in response, a fifth thumbnail image 9110' is displayed in the control panel region and a corresponding fifth slide 9110 is displayed within the canvas. Modules 5122-5124 cause the fifth slide 9110 to be added to the right of the fourth slide 9108. Referring to FIG. 8H, assume that a user again actuates the add button, and in response, a sixth thumbnail image 9112' is displayed in the control panel region and a corresponding sixth slide 9112 is displayed within the canvas. Module 5123 causes the sixth slide 9112 to be added to the left of the fifth slide 9110. Referring to FIG. 8I, assume that a user again actuates the add button, and in response, a seventh thumbnail image 9114' is displayed in the control panel region and a corresponding seventh slide 9114 is displayed within the canvas. Modules 5122-5124 cause the seventh slide 9114 to be added below the sixth slide 9112 within the canvas. Referring to FIG. 8J, assume that a user again actuates the add button, and in response, an eighth thumbnail image 9116' is displayed in the control panel region and a corresponding eighth slide 9116 is displayed within the canvas. Modules 5122-5124 cause the eighth slide 9116 to be added to the right of the seventh slide 9114, to the right of the second slide 9104 and to the right of the triangle display element 9132 in the canvas. Thus, in accordance with the example obstacle avoidance and default placement rules, slides are placed so as to be packed close together and so as to not overlap with other display elements. Further, in accordance with the example rule, display elements may become interspersed with slides and vice versa as the slides are placed near and around the display elements.

Example—Default Slide Placement

Figure 9A:
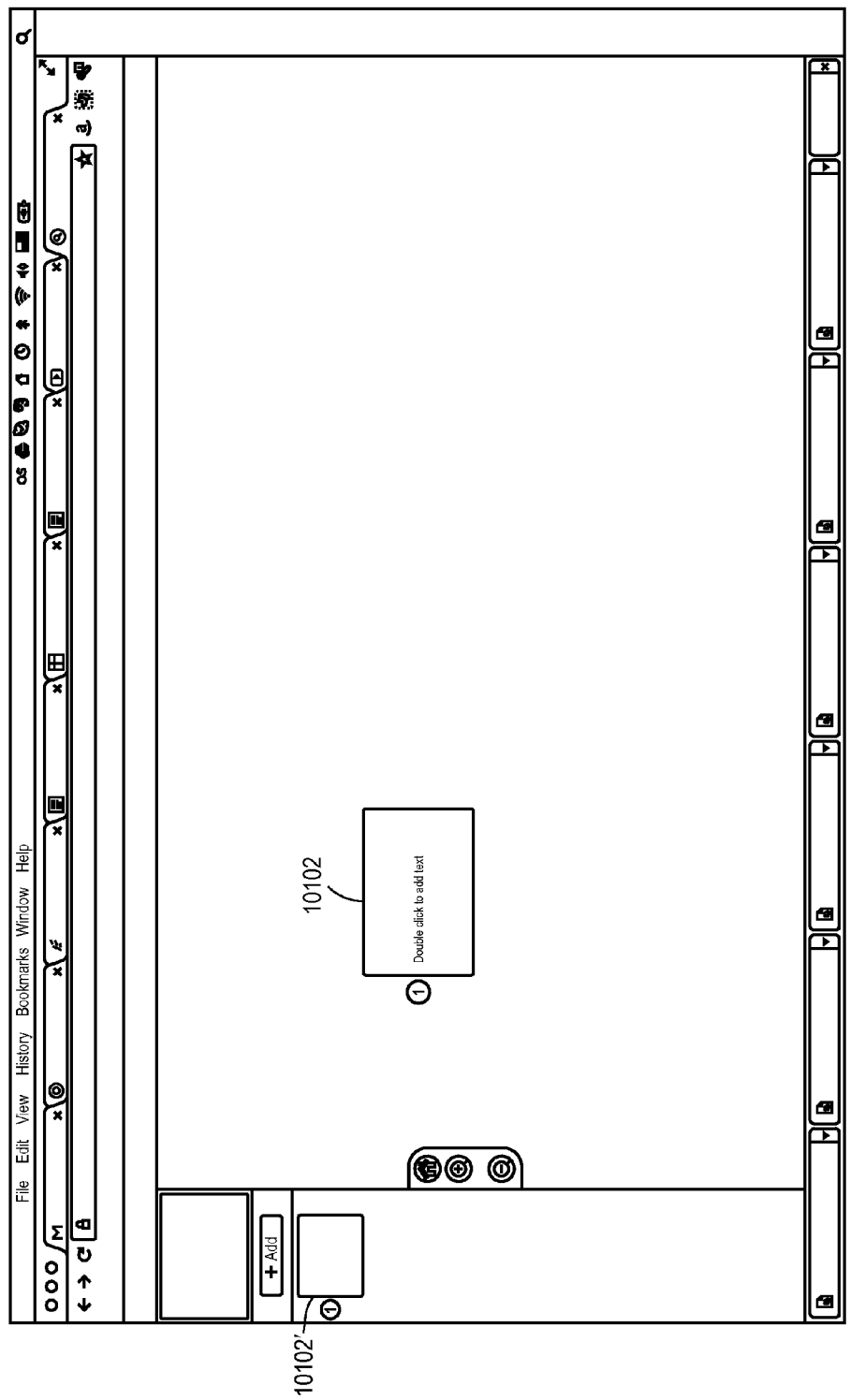
FIGS. 9A-9F are illustrative drawings of a display screen showing default placement of slides in accordance with some embodiments.
Figure 9B:
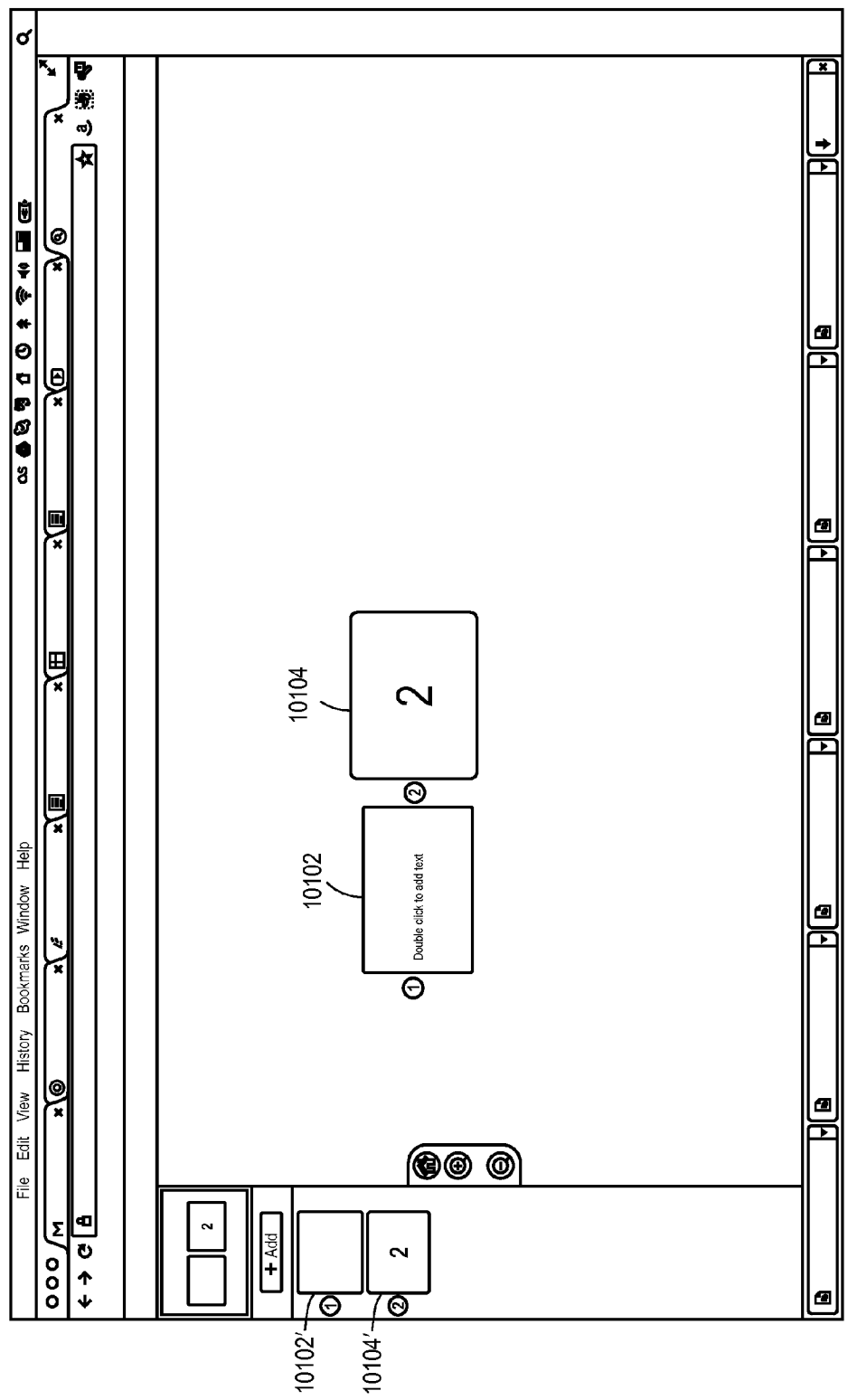
Figure 9C:
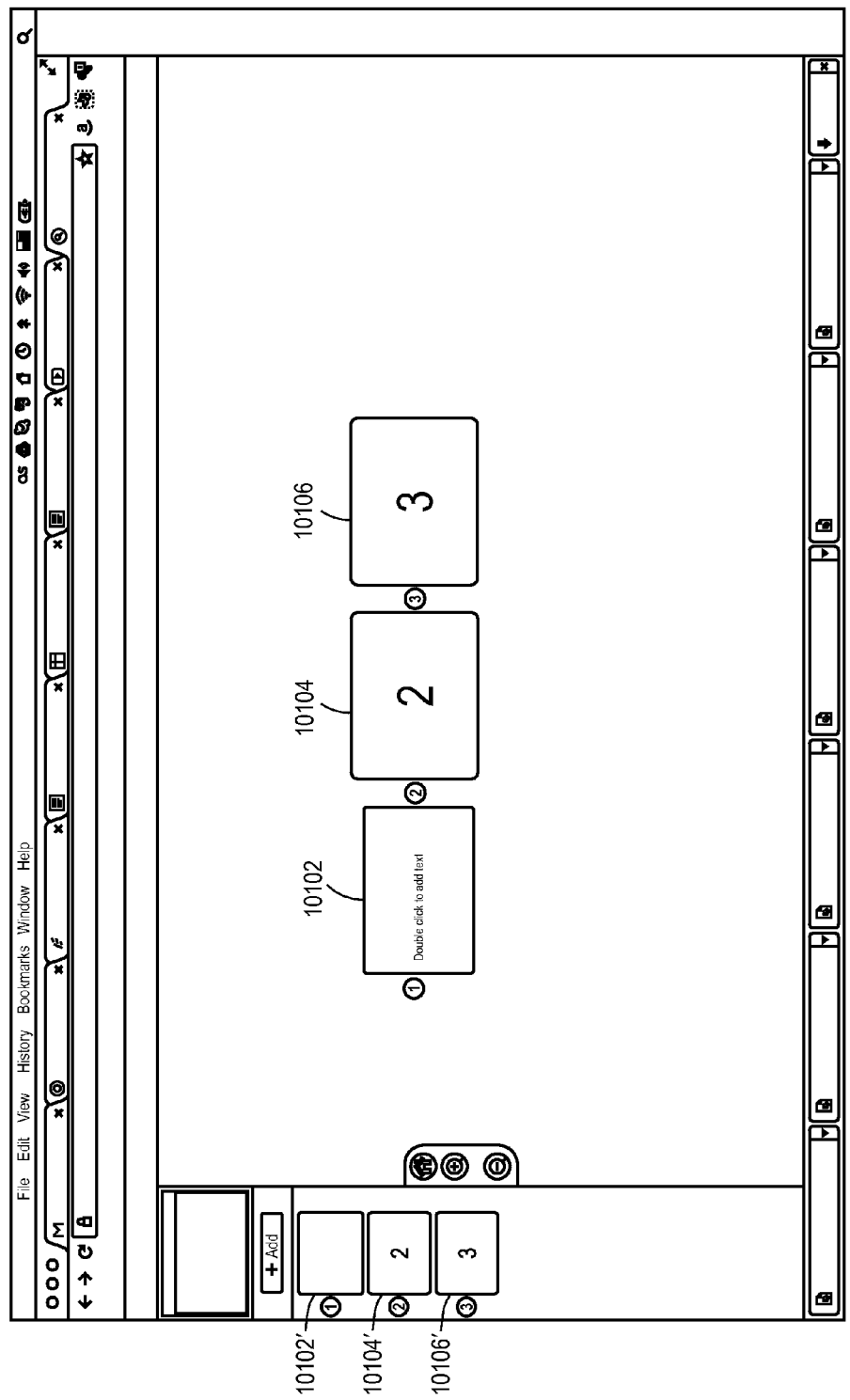
Figure 9D:
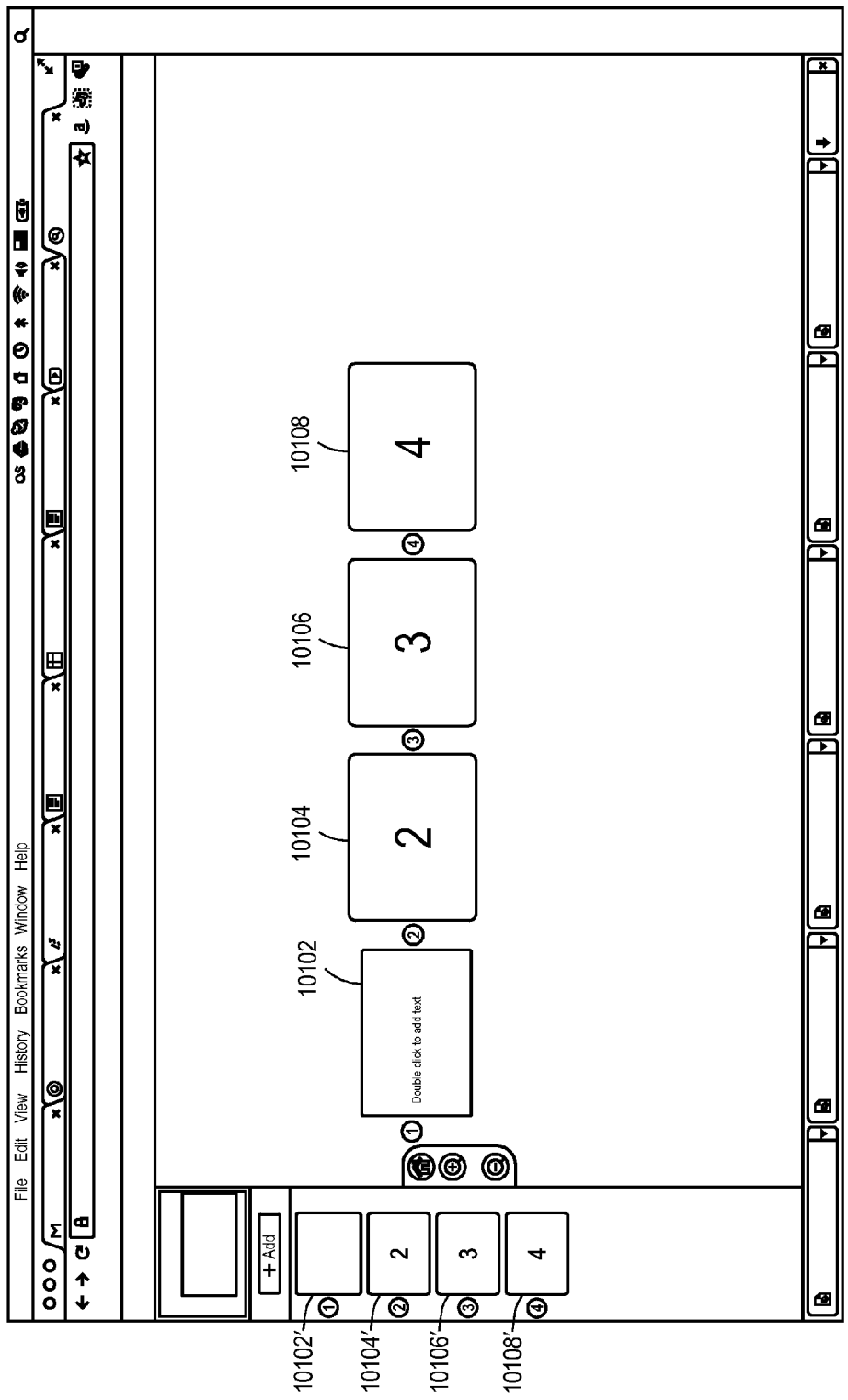
Figure 9E:
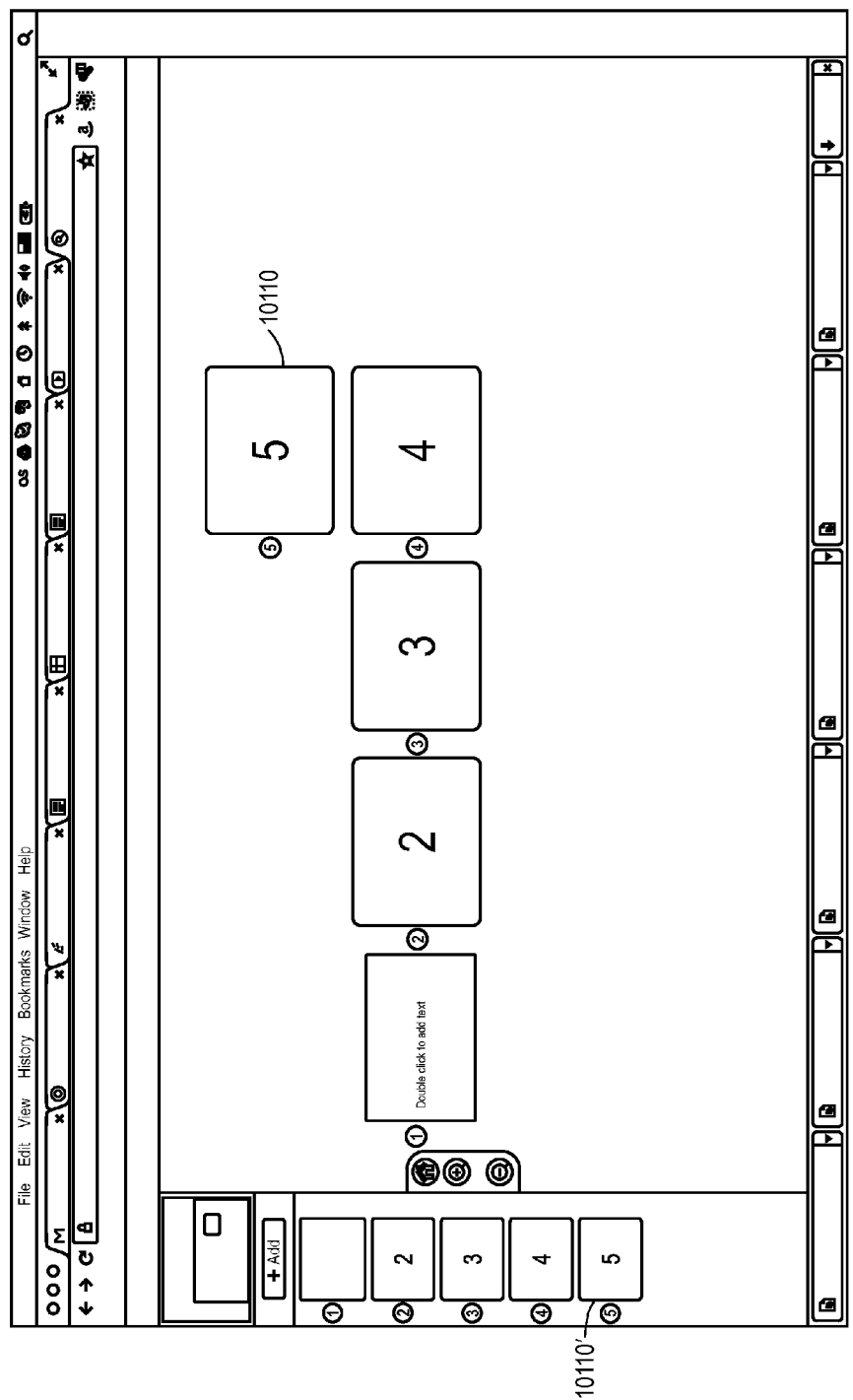
Figure 9F:
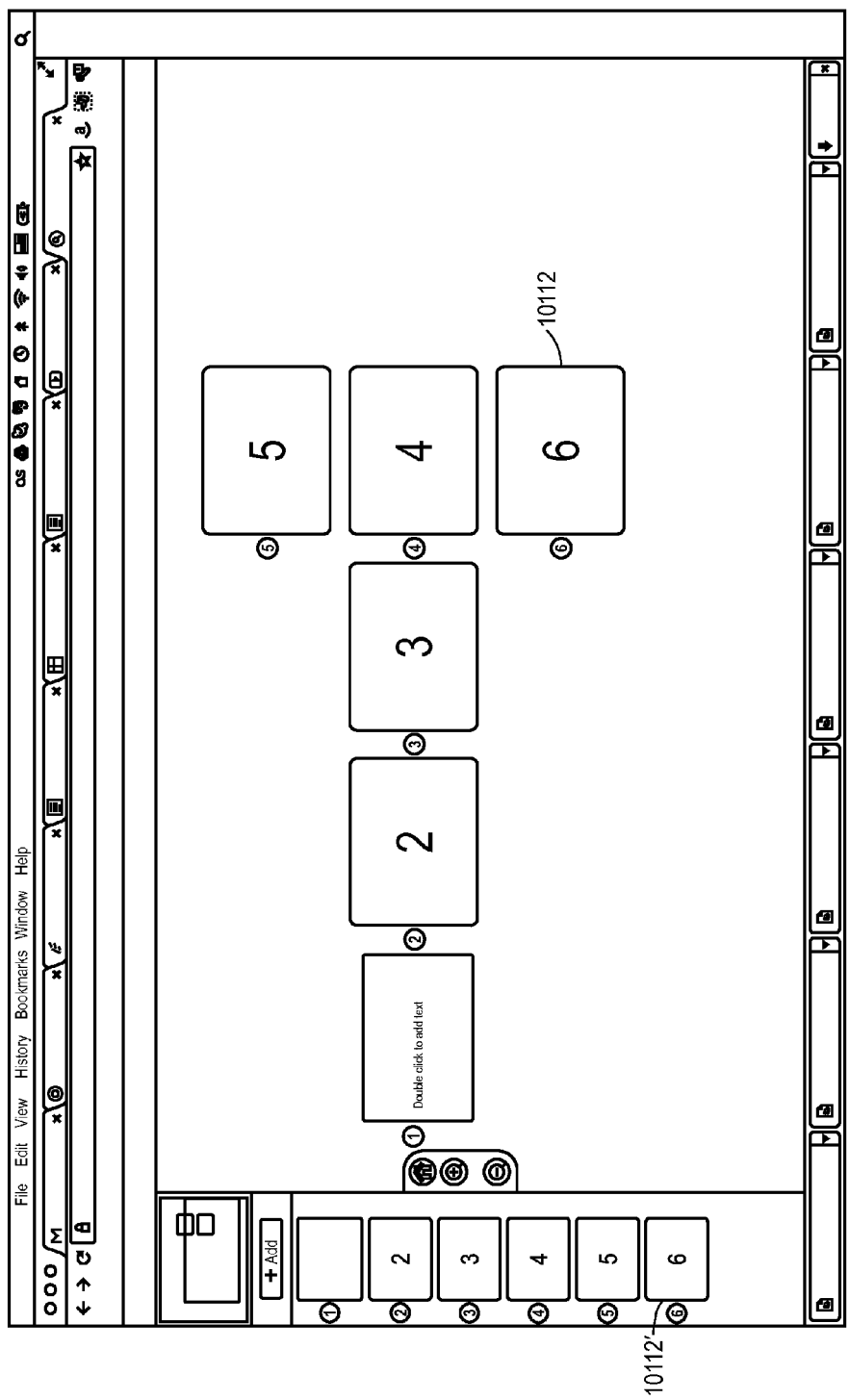

FIGS. 9A-9F are illustrative drawings of a device display screen showing default placement of slides in accordance with some embodiments. It will be appreciated that this is an example of adding slides in accordance with the first described placement alternative described above for module 5123 of FIG. 4. In this illustrative example, the default placement rule is to add each new slide to the right of the previously added slide until four slides in a have been added horizontal row, and then the next new slides are added first above and then below the fourth slide in the row. Referring to FIG. 9A, assume that a user actuates the add button, and in response, a first thumbnail image 10102' is displayed in the control panel region and a corresponding first slide 10102 is displayed in the canvas. Referring to FIGS. 9B-9D, assume that the user actuates the add button three more times in succession. In response, in accordance with the example default pattern, displays of second, third and fourth thumbnail images 10104'-10108' are added in succession within the control panel and successive corresponding displays of second, third and fourth slides 10104-10108 are added within the canvas. Further in accordance with the example default pattern, each of the second, third and fourth slides 10104-10108 are added horizontally to the right of the immediate preciously added slide within the canvas. Referring to FIGS. 9E-9F, assume that the user actuates the add button an additional two more times in succession. In response, in accordance with the example default pattern, displays of fifth and sixth thumbnail images 10110', 10112' are added in succession within the control panel and successive corresponding displays of fifth and sixth slides 10110, 10112 are added within the canvas. Further in accordance with the example default pattern, the fifth slide 10110 is added vertically above the fourth slide 10108 in the canvas, and sixth slide is added vertically below the fourth slide 10108 in the canvas. It will be appreciated that the illustrative thumbnail images and slides in FIGS. 9A-9F are blank; that is, there is no information contained within the thumbnail images and corresponding slides. However, in accordance with some embodiments, a user can edit a slide later to add information to the slide.

What is claimed is:

1. A method to place new slides on zooming user interface canvas comprising:
   receiving a user request to add a first new slide to a canvas while a viewing window is displayed at a first zoom level;
   after receiving the user request to add the first new slide to the canvas, receiving a user request to change a zoom level of the viewing window from the first zoom level to a second zoom level that is different from the first zoom level;
   changing the zoom level to the second zoom level in response to the user request to change the zoom level;
   after the user request to change the zoom level, while the viewing window is displayed at the second zoom level, receiving a user request to add a second new slide to the canvas;
   after the user request to change the zoom level, while the viewing window is displayed at the second zoom level, in response to receiving the user request to add a second new slide to the canvas, determining whether the second zoom level of the viewing window differs from the first zoom level by at least a prescribed threshold amount;
   in response to a determination that the second zoom level differs from the first zoom level by at least the prescribed threshold amount, selecting the second zoom level as a reference zoom level, and using slide placement rules to determine placement of the second new slide as a function of placement of one or more previously added slides visible in the viewing window at the second zoom level as the selected reference zoom level; and
   in response to a determination that the second zoom level differs from the first zoom level by less than the prescribed threshold amount, selecting the first zoom level as the reference zoom level, and using the slide placement rules to determine placement of the second new slide as a function of placement of one or more previously added slides visible in the viewing window at the first zoom level as the selected reference zoom level.

2. The method of claim 1, wherein determining a placement of the second new slide as a function of placement of one or more previously added slides visible in the viewing window includes placement of the second new slide using a default placement rule that holds that a new slide can be added on top of a previous slide that takes up at least a prescribed amount of the viewing window at the selected reference zoom level.

3. The method of claim 1, wherein determining a placement of the second new slide as a function of placement of one or more previously added slides visible in the viewing window includes placement of the second new slide using a default placement rule that holds that a new slide can be added on top of a previous slide that takes up an entire viewing window at the selected reference zoom level.

4. The method of claim 1, wherein determining a placement of the second new slide as a function of placement of one or more previously added slides visible in the viewing window includes placement of the second new slide using a default placement rule that holds that a new slide can be added on top of a previous slide that takes up an entire reference viewing window where the reference viewing window encompasses less than the entire viewing window at the selected reference zoom level.

5. A method to place new slides on zooming user interface canvas comprising:
  receiving a user request to add a first new slide to a canvas while a viewing window is displayed at a first two-dimensional (2D) canvas location;
  after receiving the user request to add the first new slide to the canvas, receiving user request to change a 2D canvas location of the viewing window from the first 2D canvas location to a second 2D canvas location;
  changing the 2D canvas location to the second 2D canvas location in response to the user request to change the 2D canvas location;
  after the user request to change the 2D canvas location, while the viewing window is displayed at the second 2D canvas location, receiving user request to add a second new slide to the canvas;
  after the user request to change the 2D canvas location, while the viewing window is at the second 2D canvas location, in response to receiving the user request to add a second new slide to the canvas, determining whether the second 2D canvas location of the viewing window differs from the first 2D canvas location of the viewing window by at least a prescribed threshold amount;
  in response to a determination that the second 2D canvas location differs from the second 2D canvas location by at least the prescribed threshold amount, selecting the second 2D canvas location as a reference 2D canvas location, and using slide placement rules to determine placement of the second new slide as a function of placement of one or more previously added slides visible in the viewing window at the second 2D canvas location as the selected reference 2D canvas location; and
  in response to a determination that the second 2D canvas location differs from the second 2D canvas location by at least the prescribed threshold amount, selecting the first 2D canvas location as the reference 2D canvas location, and using slide placement rules to determine placement of the second new slide as a function of placement of one or more previously added slides visible in the viewing window at first 2D canvas location as the selected reference 2D canvas location.

6. The method of claim 5, wherein determining a placement of the second new slide with reference to the contents of the viewing window at the reference 2D canvas location includes matching placement of the second new slide to a placement pattern of previously added slides.

7. The method of claim 5, wherein determining a placement of the second new slide with reference to the contents of the viewing window at the reference 2D canvas location includes placement of the second new slide using default placement rules that indicate placement of the second new slide as a function of placement of one or more previous slides.

8. The method of claim 5, wherein determining a placement of the second new slide with reference to the contents of the viewing window at the reference 2D canvas location includes placement of the second new slide using default placement rules that indicate placement of the second new slide as a function of placement of one or more display objects.

9. The method of claim 5, wherein determining a placement of the second new slide with reference to the contents of the viewing window at the reference 2D canvas location includes placement of the second new slide using default placement rules that indicate placement of the second new slide as a function of both placement of one or more previous slides and placement of one or more display objects.

10. A method to place new slides on zooming user interface canvas comprising:
  receiving a user request to add a first new slide to a canvas while a viewing window is displayed at a first zoom level and at a first two-dimensional (2D) canvas location;
  after receiving the user request to add the first new slide to the canvas, receiving a user request to change a zoom level of the viewing window from the first zoom level to a second zoom level that is different from the first zoom level;
  after receiving the user request to add the first new slide to the canvas, receiving a user request to change a 2D canvas location of the viewing window from the first 2D canvas location to a second 2D canvas location;
  changing the zoom level to the second zoom level in response to the user request to change the zoom level;
  changing the 2D canvas location to the second 2D canvas location in response to the user request to change the 2D canvas location;
  after the user request to change the zoom level and after the user request to change the 2D canvas location, while the viewing window is displayed at the second zoom level and at the second 2D canvas location, receiving a user request to add a second new slide to the canvas;
  after the user request to change the 2D canvas location, while the viewing window is displayed at the second 2D canvas location, in response to receiving the user request to add a second new slide to the canvas, determining whether the second 2D canvas location differs from the first 2D canvas location by at least a prescribed amount;
  in response to a determination that the second 2D canvas location differs from the first 2D canvas location by at least the prescribed amount, selecting the second 2D canvas location as a reference 2D canvas location, and using slide placement rules to determine placement of the second new slide as a function of placement of one or more previously added slides visible in the viewing window at the second 2D canvas location as the selected reference 2D canvas location;
  in response to a determination that the second 2D canvas location differs from the first 2D canvas location by at least the prescribed amount, selecting the first 2D canvas location as the reference 2D canvas location, and using slide placement rules to determine placement of the second new slide as a function of placement of one or more previously added slides visible in the viewing window at the first 2D canvas location as the selected reference 2D canvas location; and
  after the user request to change the zoom level, while the viewing window is displayed at the second viewing window zoom level, in response to receiving the user request to add a second new slide to the canvas, determining whether the second zoom level of the viewing window differs from the first zoom level by at least a prescribed threshold amount;

in response to a determination that the second zoom level differs from the first zoom level by at least the prescribed threshold amount, selecting the second zoom level as the reference zoom level, and using slide placement rules to determine placement of the second new slide as a function of placement of one or more previously added slides visible in the viewing window at the second zoom level as the selected reference zoom level; and in response to a determination that the second zoom level differs from the first zoom level by less than the prescribed amount, selecting the first zoom level as the reference zoom level, and using slide placement rules to determine placement of the second new slide as a function of placement of one or more previously added slides visible in the viewing window at the first zoom level as the selected reference zoom level.

\* \* \* \* \*